US012293630B2

(12) United States Patent
Savin

(10) Patent No.: US 12,293,630 B2
(45) **Date of Patent: *May 6, 2025**

(54) HEAD-TO-HEAD JAI ALAI WAGERING SYSTEM AND METHOD

(71) Applicant: Battle Court Jai Alai, LLC, Coral Gables, FL (US)

(72) Inventor: Scott Savin, Miami, FL (US)

(73) Assignee: Battle Court Jai Alai, LLC, Coral Gables, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,341

(22) Filed: Jun. 25, 2024

(65) Prior Publication Data

US 2024/0346877 A1 Oct. 17, 2024

Related U.S. Application Data

(63) Continuation of application No. 18/111,764, filed on Feb. 20, 2023, now Pat. No. 12,020,537, which is a (Continued)

(51) Int. Cl.

*G07F 17/32* (2006.01)
*G06Q 50/34* (2012.01)

(52) U.S. Cl.

CPC ........... *G07F 17/323* (2013.01); *G06Q 50/34* (2013.01); *G07F 17/3279* (2013.01); *G07F 17/3288* (2013.01)

(58) Field of Classification Search

CPC ............... G07F 17/323; G07F 17/3279; G07F 17/3288; G06Q 50/34

See application file for complete search history.

(56) References Cited

U.S. PATENT DOCUMENTS 6,383,074 B1 5/2002 Boggs
2002/0068633 A1 6/2002 Schlaifer (Continued)

OTHER PUBLICATIONS

Extended European Search Report, EP 21217367, Jun. 10, 2022.

*Primary Examiner* — Kevin Y Kim
(74) *Attorney, Agent, or Firm* — Akerman LLP

(57) ABSTRACT

A wagering system includes an interface module to receive odds data generated by an odds generator. The odds data comprises real time odds with respect to a plurality of wager options corresponding to a competition. The interface module generates display data that includes the plurality of wager options and corresponding real time odds for presentation on a graphical display of a user device. The use device is configured to receive user inputs comprising wager requests including wager amounts based on the displayed real time odds with respect to wager options of the plurality or wager options. The wager requests are given a time stamp corresponding to a time the wager request was submitted by the user. The time stamp is used to determine the real time odds applicable to the wager request. If a comparison of the real time odds applicable to the time stamp and the displayed real time odds the wager request was based indicates that the real time odds applicable to the time the wager request was submitted, a notification is generated for presentation on the user device that prompts the user to confirm the wager request subject to the updated real time odds or resubmit the wager request with a modified wager amount if the user wishes to continue with the wager based on the updated real time odds.

21 Claims, 13 Drawing Sheets

Related U.S. Application Data continuation of application No. 17/481,360, filed on Sep. 22, 2021, now Pat. No. 11,587,396.

(60) Provisional application No. 63/146,323, filed on Feb. 5, 2021.

(56) References Cited

U.S. PATENT DOCUMENTS

| | | | |
|---|---|---|---|
| 2017/0039811 | A1 | 2/2017 | Devaraj et al. |
| 2020/0349799 | A1 | 11/2020 | Amaitis et al. |
| 2020/0372763 | A1 | 11/2020 | Greiner |

Upcoming Matches

DAY 1

| GROUP 1 | | |
|---|---|---|
| Team RONRON | vs | Team IKEDA |
| Team SPINNER | vs | Team JULEN |
| Team DOUGLAS | vs | Team CARBALLO |
| Team SPINNER | vs | Team IKEDA |
| Team DOUGLAS | vs | Team JULEN |
| Team RONRON | vs | Team CARBALLO |

DAY 2

| GROUP 2 | | |
|---|---|---|
| Team JEDEN | vs | Team BEN |
| Team ANDERLUCK | vs | Team BUENO |
| Team KUBALA | vs | Team BENNY |
| Team JEDEN | vs | Team BUENO |
| Team ANDERLUCK | vs | Team BENNY |
| Team KUBALA | vs | Team BEN |

FIG. 1

Player/Team Standings

| GROUP 1 | WINS | LOSSES | WIN % |
|---|---|---|---|
| Team RONRON | - | - | - |
| Team SPINNER | - | - | - |
| Team DOUGLAS | - | - | - |
| Team CARBALLO | - | - | - |
| Team JULEN | - | - | - |
| Team IKEDA | - | - | - |

| GROUP 2 | WINS | LOSSES | WIN % |
|---|---|---|---|
| Team BEN | - | - | - |
| Team BUENO | - | - | - |
| Team BENNY | - | - | - |
| Team KUBALA | - | - | - |
| Team ANDERLUCK | - | - | - |
| Team JEDEN | - | - | - |

| GROUP 3 | WINS | LOSSES | WIN % |
|---|---|---|---|
| Team DIAZ | - | - | - |
| Team VUELO | - | - | - |
| Team CRB | - | - | - |
| Team JUICE | - | - | - |
| Team COOL FITNESS | - | - | - |
| Team EL BARBA | - | - | - |

FIG. 2

HEAD-TO-HEAD JAI ALAI WAGERING SYSTEM AND METHOD

CROSS-REFERENCE TO RELATED APPLICATIONS

The present application is a continuation of U.S. patent application Ser. No. 18/111,764, filed Feb. 20, 2023, now U.S. Pat. No. 12,020,537, which is a continuation of U.S. patent application Ser. No. 17/481,360, filed Sep. 22, 2021, now U.S. Pat. No. 11,587,396, which claims benefit under 35 U.S.C. § 119 (c) of U.S. Provisional Application No. 63/146,323, filed Feb. 5, 2021, all of which are hereby incorporated herein in their entirety by reference.

BACKGROUND

The present application is directed to the technical field pertaining to systems and methods of providing live wagering services with respect to competitions. The systems and methods may be particularly applicable to live wagering with respect to jai alai competitions. The systems and methods may be particularly applicable to providing à la carte digital wagering services from which wagering platforms may select all or portions of the digital wagering services to achieve a desired level of autonomy.

SUMMARY

In one aspect, In one aspect, a wagering system includes an interface module to receive odds data generated by an odds generator. The odds data comprises real time odds with respect to a plurality of wager options corresponding to a competition. The interface module generates display data that includes the plurality of wager options and corresponding real time odds for presentation on a graphical display of a user device. The use device is configured to receive user inputs comprising wager requests including wager amounts based on the displayed real time odds with respect to wager options of the plurality or wager options. The wager requests are given a time stamp corresponding to a time the wager request was submitted by the user. The time stamp is used to determine the real time odds applicable to the wager request. If a comparison of the real time odds applicable to the time stamp and the displayed real time odds the wager request was based indicates that the real time odds applicable to the time the wager request was submitted, a notification is generated for presentation on the user device that prompts the user to confirm the wager request subject to the updated real time odds or resubmit the wager request with a modified wager amount if the user wishes to continue with the wager based on the updated real time odds.

In one example, the wager requests include associated account information of the user of the user device from which wagered funds are to be withdrawn and winnings are to be deposited.

In one example, the system includes a transaction module to process transactions with respect to the wager requests. The transaction module may be configured to use the associated account information to identify and debit accounts associated with the users in the respective amounts wagered.

In one example, the system includes a wager module to receive the wager requests and scoring related data with respect to the competition. In one permutation, the wager module may be configured to analyze the scoring related data to determine if a wager of the wager requests is complete. If the wager module determines the wager is complete, the wager module is configured to determine if the wager is a winning wager. If the wager is a winning wager, the transaction module is configured to credit the account associated with the user requesting the wager.

The system may further include a scoring module to collect scoring related data from the competition and the odds generator. The odds generator may be configured to receive the scoring related data from the scoring module and generate the odds data based at least in part on the scoring related data. The system may include a transaction module configured to process transactions with respect to the wager requests from the users. The system may be configured to provide the data and functionalities of the respective scoring module, odds generator, interface module, and transaction module as à la carte digital wagering services from which wagering platforms may select all or portions of the digital wagering services to achieve a desired level of autonomy. The odds generator may include pre-defined rules relating to factors to be applied for participating wager platforms and is configured to apply the rules to the odds data generated specific for the participating wager platforms.

In another aspect, a wagering method includes receiving odds data generated by an odds generator, the odds data comprising real time odds for a plurality of wager options with respect to a competition; generating display data that includes the plurality of wager options and corresponding real time odds for presentation on a graphical display of a user device configured to receive user inputs comprising wager requests including wager amounts based on the displayed real time odds with respect to wager options of the plurality or wager options; associating a time stamp with each wager request corresponding to a time the wager request was submitted by the user; comparing the displayed real time odds the wager request was based with real time odds applicable to the time stamp to determine if the real time odds were updated prior to submission of the wager request; and generating a notification for presentation on the user device if the real time odds were updated prior to submission of the wager request, wherein the notification prompts the user to confirm the wager request subject to the updated real time odds or resubmit the wager request with a modified wager amount if the user wishes to continue with the wager based on the updated real time odds.

In one example, the method further includes determining whether to accept a wager specified in one of the wager requests and, if accepted, determining if the accepted wager is complete. If the accepted wager is complete, the method may include determining if the user associated with the accepted wager has won the accepted wager. If the user has won the accepted wager, the method may include crediting an account associated with the user.

In one example, the method includes integrating video of the competition into the graphical display.

In one example, the method includes receiving the wager requests from the user devices that are initiated by the users of the user devices via user interaction with the graphical display that defines a desired wager to be made with respect to the plurality of wager options.

In one example, the wager requests are associated with user accounts from which wagered funds are to be withdrawn and winnings are to be deposited.

The method may further include determining whether to accept wagers specified in wager requests and, if accepted, debiting the respective user accounts associated with the wager requests in amounts corresponding to the amounts wagered.

In one example, the method includes collecting real time scoring related data from the competition; transmitting the real time scoring related data to the odds generator; processing the wager requests; and providing the real time scoring related data, the real time odds, and the processing of wager requests as à la carte digital wagering services from which wagering platforms may select all or portions of the digital wagering services to achieve a desired level of autonomy.

In yet another aspect, a non-transitory computer-readable medium having computer-executable instructions that, when executed by a processor, cause the processor to perform operations of a wagering method comprising receiving odds data generated by an odds generator, the odds data comprising real time odds for a plurality of wager options with respect to a competition; generating display data that includes the plurality of wager options and corresponding real time odds for presentation on a graphical display of a user device configured to receive user inputs comprising wager requests including wager amounts based on the displayed real time odds with respect to wager options of the plurality or wager options; associating a time stamp with each wager request corresponding to a time the wager request was submitted by the user; comparing the displayed real time odds the wager request was based with real time odds applicable to the time stamp to determine if the real time odds were updated prior to submission of the wager request; and generating a notification for presentation on the user device if the real time odds were updated prior to submission of the wager request, wherein the notification prompts the user to confirm the wager request subject to the updated real time odds or resubmit the wager request with a modified wager amount if the user wishes to continue with the wager based on the updated real time odds.

In one example, the operations further include determining whether to accept a wager specified in one of the wager requests and, if accepted, determining if the accepted wager is complete. If the accepted wager is complete, the method may include determining if the user associated with the accepted wager has won the accepted wager. If the user has won the accepted wager, the method may include crediting an account associated with the user.

In one example, the operations include integrating video of the competition into the graphical display.

In one example, the operations include receiving the wager requests from the user devices that are initiated by the users of the user devices via user interaction with the graphical display that defines a desired wager to be made with respect to the plurality of wager options.

In one example, the wager requests are associated with user accounts from which wagered funds are to be withdrawn and winnings are to be deposited.

The operations may further include determining whether to accept wagers specified in wager requests and, if accepted, debiting the respective user accounts associated with the wager requests in amounts corresponding to the amounts wagered.

In one example, the operations include collecting real time scoring related data from the competition; transmitting the real time scoring related data to the odds generator; processing the wager requests; and providing the real time scoring related data, the real time odds, and the processing of wager requests as à la carte digital wagering services from which wagering platforms may select all or portions of the digital wagering services to achieve a desired level of autonomy.

BRIEF DESCRIPTION OF THE DRAWINGS

For a complete understanding of the present disclosure and its features and advantages, reference is now made to the following description, taken in conjunction with the accompanying drawings, in which:

FIG. 1 is an example schedule for a head-to-head (H2H) jai alai competition system according to various embodiments described herein;

FIG. 2 is an example standings for three groups of a H2H jai alai competition system according to various embodiments described herein;

DESCRIPTION

Figure 3:
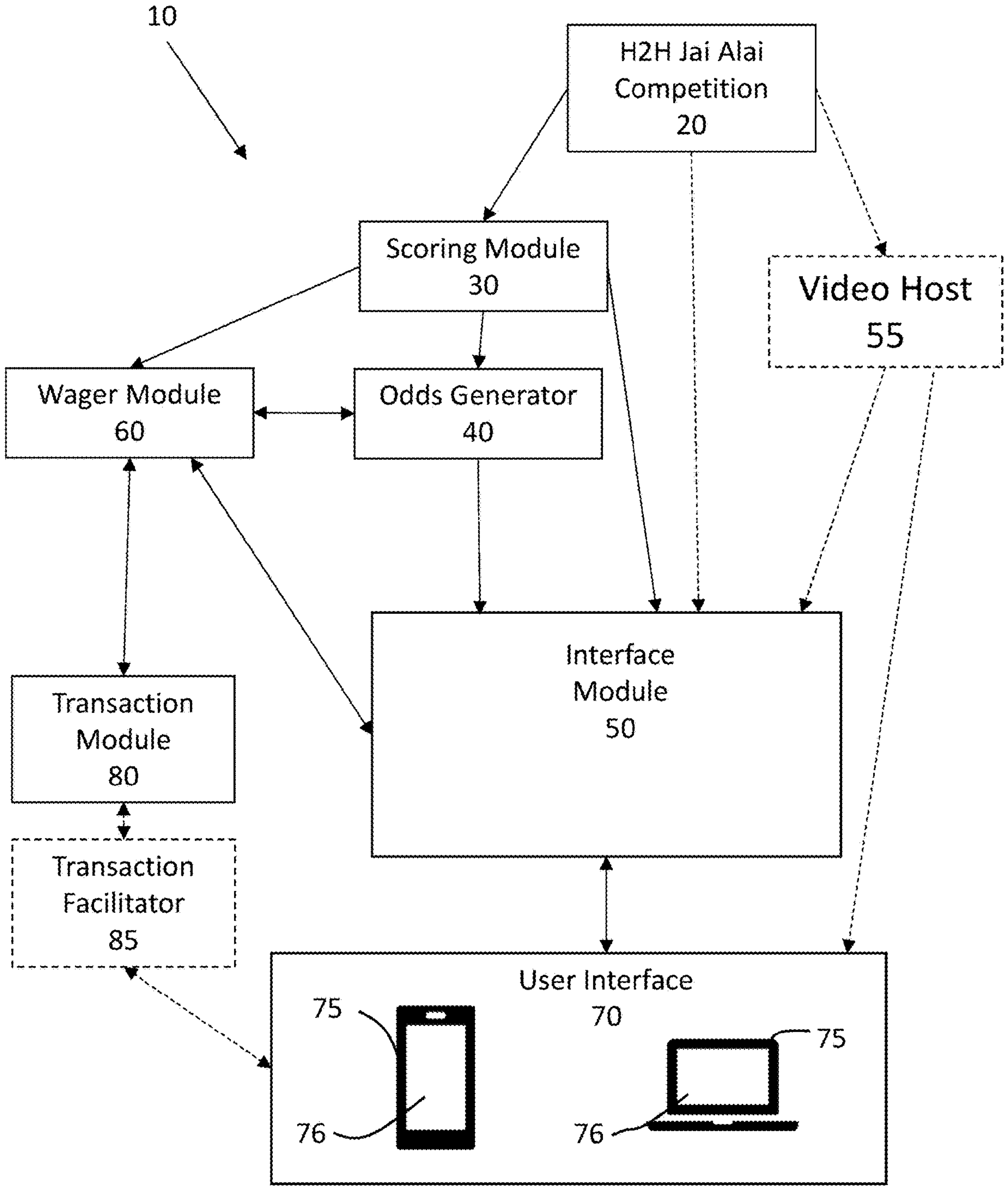
FIG. 3 schematically illustrates various features of a H2H jai alai wagering system according to various embodiments described herein.

The present application describes new head-to-head (H2H) jai alai game and methods for recreation or competitive style matches. The H2H jai alai game and related competitions may be included in or associated with wagering systems and methods. That is, the present application also describes H2H jai alai wagering systems and methods that, for the first time, allow users to place wagers on H2H jai alai. In some embodiments, the systems and methods may include a real time and/or remote H2H jai alai wagering system. For example, H2H scores, game events, and/or team related information may be analyzed in real time during play. The analysis may be used to generate and update wagering odds associated with the current or a future match, current or future sets or points, and/or larger competition for presentation to users in real time. Users may interact with the presentation of odds and place wagers based on the updated odds. The provision of real time odds and ability to place wagers on the updated odds improves the ability of fans to accurately place wagers while keeping them fully engrossed and up-to-date with play and its relationship to wagers, further maintaining interest in the game and broader competition.

In various embodiments, the system includes or incorporates H2H jai alai team match play with each team including one or two players, although additional players per team could be used, with the number of players on each team typically corresponding.

A match may typically include a best of 3 to 11 sets or first team to win a majority of the allotted sets. For example, a match may include a best of 3, 5, 7, 9, or 11 sets. Each set may be played to between 4 and 15 points, such as 5, 6, 7, 8, 9, 10, 11, 12, 13, 14, or 15 points.

Each set may include a number of point plays in which points may be awarded according to traditional scoring such as failed serve, two bounces, out of bounds, holding the ball, juggling the ball, or interference/foul. One team serves for each point play, with each team given up to two serves to put the ball in play, with no points being awarded for a failed first serve that is followed by a regulation second serve, which requires bouncing the ball behind a service line and rebounding the ball from the front wall for an initial bounce between line number 4 and line number 7 unless played on the fly by the opponent. The winner of the point play retains the serve. In one example, only the team that served the point play may be awarded a point for winning the point play. In another example, either team may be awarded a point by winning a point play. In another example, the non-serving team may be awarded a point following two failed serves by the opponent but must otherwise serve the point play to be awarded the associated points.

The H2H jai alai game may incorporate one or more scoring variations to increase interest in the competition and/or speed play. In some embodiments, additional points for each point play may be awarded in later sets such as in second, third, fourth, fifth, and/or later sets, as the case may be. In one embodiment, ties may be scored as draws, requiring the teams to start a new set in order to continue to accumulate sets. In another embodiment, additional point plays may be conducted to avoid ties, e.g., a team must win by one or two points when their opponent has six or more points. In one variation, teams rotate each set for serving and receiving duties for an entire set. In some embodiments, scoring variations may include awarding a team an additional set or more additional sets for a predetermined number of sets won in a row. In one example, a team winning two sets in a row may be awarded an additional set win or two additional set wins for three sets won in a row. The additional set wins may be awarded independently or on a cumulative basis. For instance, an extra set win may be awarded for each pair of consecutive wins. In a further example, a team may choose to be awarded one or more additional set wins following a streak of two or more consecutive set wins or may forgo the set wins they would have been awarded for an opportunity to be awarded additional set wins for winning one or more additional sets in row. For example, an additional set win may be awarded for winning two sets in a row, and two additional set wins may be awarded for winning three sets in a row. Once the team elects to receive the awarded set win, the set win streak for purposes of the awarding of additional set wins may restart. In another permutation, the additional set wins are cumulative and the team is awarded the number of set wins either when the addition of the awarded set wins would win the match if added to the total set wins or when the set win streak is broken. In yet another permutation, upon achieving a predetermined number of consecutive set wins, such as two or three, the team may be awarded the win for the match. In one example, a match includes best of 5 or more sets, a team winning multiple sets in a row may be awarded the win for the match or may be awarded an additional set win.

Table 1 illustrates an example format for a H2H jai alai competition system according to one embodiment.

TABLE 1

| Head-to-Head Jai Ali/Jai Alai H2H |
|---|
| Two one or two player teams competing head-to-head in jai alai on the court at a time |
| Matches are won by the first team to win two sets |
| Each set is played to six points |
| Winner of each point retains the serves |
| Serving team given two opportunities to execute regulation serve |
| Loser of prior set serves first in next set |
| Points are award to serving team only (variation: either team may score by winning a point play, regardless of serving duties) |

The competition system includes playing H2H team matches with each team including at least one player. A match is played to the best of three sets or first team to win two sets. Each set may include a number of point plays in which points may be awarded. Points may be awarded as described above, such as failed service (e.g., two failed serves on a point), two bounces, out of bounds, holding the ball, juggling the ball, or interference/foul. Each set may be played to six points. Additional point plays may be conducted to avoid ties, such as the first team to win by one or two when their opponent has six or more points. In another variation, draws may be used.

Each team is given up to two serves to put the ball in play, with no points being awarded for a failed first serve that is followed by a regulation second serve. The winner of the point play retains the serve. As noted above, scoring variations may include only the team that served the point may be awarded a point for winning the point play, either team may be awarded a point by winning a point play regardless of whether the team served the point play, or the non-serving team may be awarded a point following two failed serves by the opponent but must otherwise serve point plays to be award points.

Matches may be played within a single game, season, tournament, or other suitable contexts. For example, teams of one or two players may be placed into groups/divisions and/or conferences of a league where teams with the best records within the division, conference, or league may compete further in playoffs or tournament play. In one example, multiple divisions including two or more teams in each division will play each other for top H2H wins. In a further embodiment, winners of each division may play further H2H matches for a league title.

FIG. 1 illustrates a schedule of H2H jai alai wherein single player teams are assigned to groups for intragroup play. Each group includes six teams. Each player in group 1 plays two matches the first day and each player in group 2 plays two matches the first day, which in this instance is the day following the first day group 1 plays. On subsequent days, teams of each group may play the additional teams of the group. The process may be repeated after each team has played all five teams in the group.

Notably, in some instances, teams may play other group teams in other orders and may play more games with some teams than other teams in the group. The number of teams, groups, or games each group plays may vary. Similarly, playing time and time/days between matches for players, teams, and groups may be modified.

FIG. 2 illustrates an example standings for a league with three groups, each group having 6 teams consisting of a single player. The number of matches won and matches lost may be included for each team in the standings. A win percentage may also be presented. Other information such as number of sets, point margins, points allowed, points scored, etc. may also be provided in some embodiments.

As introduced above, aspects of the H2H jai alai competition systems and methods may be incorporated into a wagering system. The wagering system may be configured to interface with users to deliver odds to users on a continual, real time basis and to receive wagers from users based on the odds in real time. The wagering system may include transmission of one or more data streams for analysis and/or viewing. The data streams may include one or more of scoring related data, odds data, video data, team data, audio data, transaction data, and the like. The data streams may be analyzed to generate updated odds associated with a future or current match, current or subsequent sets or points in the current or a future match, and/or larger competition for presentation to users in real time. Users may then place wagers based on the updated odds. The provision of real time odds and ability to place wagers on the updated odds improves the ability of viewers to accurately place wagers while keeping them fully engrossed and up-to-date with play, further maintaining interest in the game and broader competition.

In one example, wagering is pari-mutuel. In another example, wagering includes sports wagering or non-pari-mutuel wagering. In a further example, the wagering includes non-pari-mutuel wagering on H2H jai alai according to the present disclosure in a non-rotational format. Wagers may be placed on winners of matches, sets, or combinations of matches and/or sets. Wagers may be placed straight up, handicapped, fixed odds, live betting, flat betting, wire-to-wire. Wagers may be placed on total points, first point, last point, number of sets won in a match, etc. The system may further include other wagering types including prop betting and various exotic wagering.

Various components of the H2H jai alai wagering systems and methods described herein may be executed by hardware or be embodied in machine readable instructions stored in memory and executable by hardware. For example, the H2H jai alai wagering systems and methods may include a memory that stores instructions, and a processor that executes the instructions to perform the operations described herein. The executed instructions may include generating team matches, schedules, and/or odds, e.g., handicapping lines. The executed instructions may include scoring, wager intake, odds updates such as line adjustments, bettor winner determinations and payout calculations, or combinations thereof. The instructions may be executed in real time for delivery of rich interactive content to users during play. For example, the system may generate and distribute up-to-the-minute odds for presentation to and interaction with users wherein users may place wagers based on the up-to-the-minute odds. The provision of real time odds and availability to place timely wagers, with all available information at-hand, improves wagering accuracy while keeping users fully engrossed and up-to-date with play, further building interest in the H2H jai alai game, it's dynamic changes throughout the game, and the broader competition.

FIGS. 3-8 illustrate various configurations of a H2H jai alai wagering system 10 according to various embodiments, wherein like features represent like numbers. The drawings are generally described below with reference to particular figures to assist the reader; however, the descriptions and variations thereof of the various functionalities and operations of the modules, generators, platforms, and subsystems in the drawings are to be understood to have applicability to the other drawings and associated descriptions. Such descriptions and related functionalities may be taken in any combination with any other descriptions and functionalities of the H2H jai alai wagering system 10. With particular reference to FIG. 3, a H2H jai alai wagering system 10 may include or incorporate data generated by a H2H jai alai competition 20. The H2H jai alai competition 20 may be played and operated as described above and elsewhere herein with respect to the H2H jai alai competition systems and methods.

The H2H jai alai wagering system 10 may include or incorporate score related data generated by the H2H jai alai competition 20. For example, the H2H jai alai wagering system 10 may include a scoring module 30 configured to collect score related data generated by the H2H jai alai competition 20. The score related data may include play-by-play activity, serves, faults, score, identification of game situations, player/team identities, player injuries, or the like. The scoring module 30 may further process the scoring related data for handling by one or more of the odds generator 40, wager module 60, or interface module 50. The processing may include formatting or organizing the scoring related data for utilization by the particular modules or the generator. The processing may be common or different or specific to particular to the modules or generator. The processing may be specific for a particular participating sportsbook or H2H jai alai wager platform, as described in more detail below. The scoring related data may be provided as part of an H2H jai alai wager servicing system provided to one or more H2H jai alai wager platforms, as described in more detail below.

The H2H jai alai wagering system 10 may include or incorporate odds data corresponding to a plurality of wager options related to the H2H jai alai competition 20. The scoring module 30 may provide, e.g, transmit, the score related data to an odds generator 40. In one example, the H2H jai alai wagering system 10 includes the odds generator 40. The odds generator 40 may use the score related data to generate odds for a plurality of wager options. In some embodiments, the odds generator 40 may use additional information to generate the odds. For example, in some instances, other information may include historical player or team performance broadly and/or situational as it pertains to a current game situation at hand during the H2H jai alai competition 20 and/or the relevant wager options. Such other information may be considered scoring related data and may be provided by the scoring module 30 prior to or during the H2H jai alai competition 20 or may be otherwise collected or generated by the odds generator 40 as to be available for use in generating the odds data. The odds generator 40 may further process the odds data for handling by one or more of the wager module 60 or interface module 50. The processing may include formatting or organizing the odds data for utilization by the particular modules. The processing may be common or different or specific to particular modules. The processing may be specific for a particular participating sportsbook or H2H jai alai wager platform, as described in more detail below. The odds data may be provided as part of an H2H jai alai wager servicing system provided to one or more H2H jai alai wager platforms, as described in more detail below.

The H2H jai alai wagering system 10 may include an interface module 50 configured to generate an interactive display incorporating the odds data with the plurality of wager options for interaction with users. For example, the odds generator 40 may provide or transmit the odds data to the interface module 50. The interface module 50 may utilize the odds to generate display data, which may also be referred to as an interactive display, which may include code or instructions that when executed by a processor of an electronic device, such as a user device 75, generates the interactive display with respect to a user device 75 that includes the plurality of wager options that incorporate the odds data. The interface module 50 may generate different or common displays for different participating sportsbooks or H2H jai alai wager platforms associated with the sportsbooks. The display data may be provided as a product as part of an H2H jai alai wager servicing system provided to one or more H2H jai alai wager platforms, as described in more detail below.

The interface module 50 may transmit the display data, including the odds integrated with the plurality of wager options, to a user interface 70 where it may be presented on a display 76 of a user device 75 for viewing and interaction by a user. A user device 75 may include a screen-type display 76 for presenting the interactive display. In various embodiments, the user interface 70 comprises a webpage or app executed on a user device 75. The user interface 70 may comprise an electronic user device 75 including a processor for producing the interactive display. The user device may further include memory for storing instructions that when executed by the processor perform operations of the user device 75. The user device 75 may be electronic. The user device 75 may be internet or cellular enabled or otherwise configured to receive electronic communication. The user device 75 may be or include a laptop, desktop, computer, tablet, smart phone, smart television, television, projector, or the like. In a further or another embodiment, the user interface 70 includes one or more interactive components to allow a user to interact with the presented data, e.g., touch screen, mouse, keyboard, hard buttons, soft buttons, knobs, switches, or the like. The interface module 50 may receive score related data and incorporate the score related data into the interactive display. For example, an interactive display of current scores, past scores, schedules, rankings, tournament standings may be generated by the interface module 50 for presentation on the user device 75.

A user may interface with the H2H jai alai wagering system 10 by viewing wager options and associated odds at the user interface 70, e.g., via a user device 75, to place one or more wagers with respect to the wager options. Using the user device 75, the user may specify interact with the display to select one or more of the plurality of wager options. Selection of a wager option may allow a user to specify an amount to wager, which may be provided in one or more graphical quick buttons specifying particular wager amounts, fields allowing the user to enter an amount, or the like.

The H2H jai alai wagering system 10 may include a wager module 60 configured to receive and/or process wagers requests. The wager module 60 may interface with a user interface 70 to conduct wager related transactions, e.g., receive wager requests from the user interface 70. The wager module 60 may be accessed through the user interface 70, e.g., via a user device 75, to select from the wager options, e.g., utilizing a touch screen or mouse or other interactive component to select wager options or link associated with the presented wager options and indicate an amount to wager for each selection. The selection and wager amount request may be transmitted from the user device 74 to the wager module 60. In some embodiments, the wager module 60 may be configured to receive scoring related data, e.g., from the scoring module 30, to identify when wagers are complete and/or identify winners of completed wagers. In an example wherein the wager module 60 is tasked with identification of completed wagers, e.g., user winner or house winner, the wager module 60 may receive scoring related data from the scoring module 30. In some embodiments, the wager module 60 receives scoring related data from the odds generator 40 or interface module 50. The scoring related data may be analyzed by the wager module 60 to identify the completed wagers and winners. The wager module 50 may process wager requests from a plurality of participating sportsbooks or H2H jai alai wager platforms associated with the sportsbooks, as described in more detail below. Wager processing by the wager module 50 may be provided as service as part of an H2H jai alai wager servicing system provided to one or more H2H jai alai wager platforms, as described in more detail below.

The wager module 70 may include or be configured to interface with a transaction module 80. The transaction module 80 may be configured to process wager related transactions. Wager related transactions may include crediting and/or debiting a wager account associated with a user. For example, in some embodiments, users may establish a wager account with the H2H jai alai wagering system 10. Additionally or alternatively, users may pay wagers and/or receive winning wager payouts directly from outside accounts or via cash. For example, processing wager related transactions, such as wager fund transfers and winner payouts, may include the transaction module 80 and/or user device 75 utilizing a transaction facilitator 85 such as a banking or other financial institution and/or third-party digital/electronic payment platforms to transfer or credit/debit accounts of the parties to the wager. The transaction module 80 may process wager related transactions with respect to a plurality of participating sportsbooks or H2H jai alai wager platforms associated with the sportsbooks, as described in more detail below. Conducting wager related transactions between parties to a wager may be provided as service as part of an H2H jai alai wager servicing system provided to one or more H2H jai alai wager platforms, as described in more detail below.

In various embodiments, the H2H jai alai wagering system 10 is configured to distribute and/or provide video data of the H2H jai alai competition 20 to the user interface 70. In one embodiment, the interface module 50 collects video data from the H2H jai alai competition and provides the data for presentation to the user interface 70. The interface module 50, which may comprise a server, such as a webserver and/or app server, may provide the video data to the user interface 70 for presentation of the video data along with display of the wager options and associated odds on the user device 75. In one embodiment, the interface module 50 may edit the video data to incorporate scoring related data. For example, the interface module 50 may incorporate scores, player and/or team names, identification of game situations, historical performances of players and/or teams in similar situations, player injuries, or other score related information. The video data may comprise live or real time video of the H2H jai alai competition 20 and, in some configurations, may also include audio data of the H2H jai alai competition 20. In one example, the audio data includes announcer audio providing real time scoring and play-by-play information about the game. As introduced above, the interface module 50 may receive scoring related data collected by the scoring module 30 and the interface module 50 may incorporate the scoring into the display data for display on the user device. Additionally or alternatively, in some embodiments, the interface module 50 may receive or collect video data of the H2H jai alai competition 20. The video data may include live video data of the H2H jai alai competition 20. The interface module 50 may incorporate the video data with one or more of the scoring related data or odds data into the display data. Such display data may be referred to as video display data. In one example, the video display data may include a current score overlaid with video data H2H jai alai competition 20. In one embodiment, the interface module 50 may generate the video display data to include one or more historical score or player/team performance related data, such as a team's record or performance against the field or particular opponents, player/team statistics, or statistics of a player/team in similar situations in the past and/or over periods of time.

The video data may be incorporated into video display data generated by the interface module 50 or may be otherwise accessible to users, e.g., via user devices 75. For example, the video data and/or video display data may be transmitted to user devices 75 directly or via a video host 55, such as a website, streaming service, or television network, to which the video data is provided. The video display data may be transmitted to user interfaces 70 in a same or different data stream than display data incorporating odds and/or scoring related data. In one example, video data and/or video display data may be provided to the user interface 70 via an API to a video host 55, which may be linked or embedded in an associated app or webpage served to the user device 75 and may be presented together with or separately from other display data. In a further or another example, the video data and/or video display data is provided to or otherwise collected by a third-party network or video hosting platform, such as youtube.com. In some embodiments, the interface module 50 includes a website or app server and the user interface 70 comprises a browser, webpage, or app accessible or executed using a user device 75 to view and interact with display data as described herein.

The user interface 70 may include one or more user devices 75. In some embodiments, the user interface 70 includes a sportsbook. For example, the display data may be provided to a participating sportsbook for display and interaction as described herein with respect to the user device 75. That is, a participating sportsbook may include or transmit data to a user device 75 including a laptop, desktop, computer, tablet, smart phone, smart television, television, projector, or the like. In some embodiments, the H2H jai alai wagering system 10 is configured to transmit system data as described herein directly to user devices 75 on behalf of participating sportsbooks. The participating sportsbook may provide the system data and functionalities to user devices 75, which will typically to user devices 75 of users wagering through the participating sportsbook, for interaction with the data as described herein.

Figure 4:
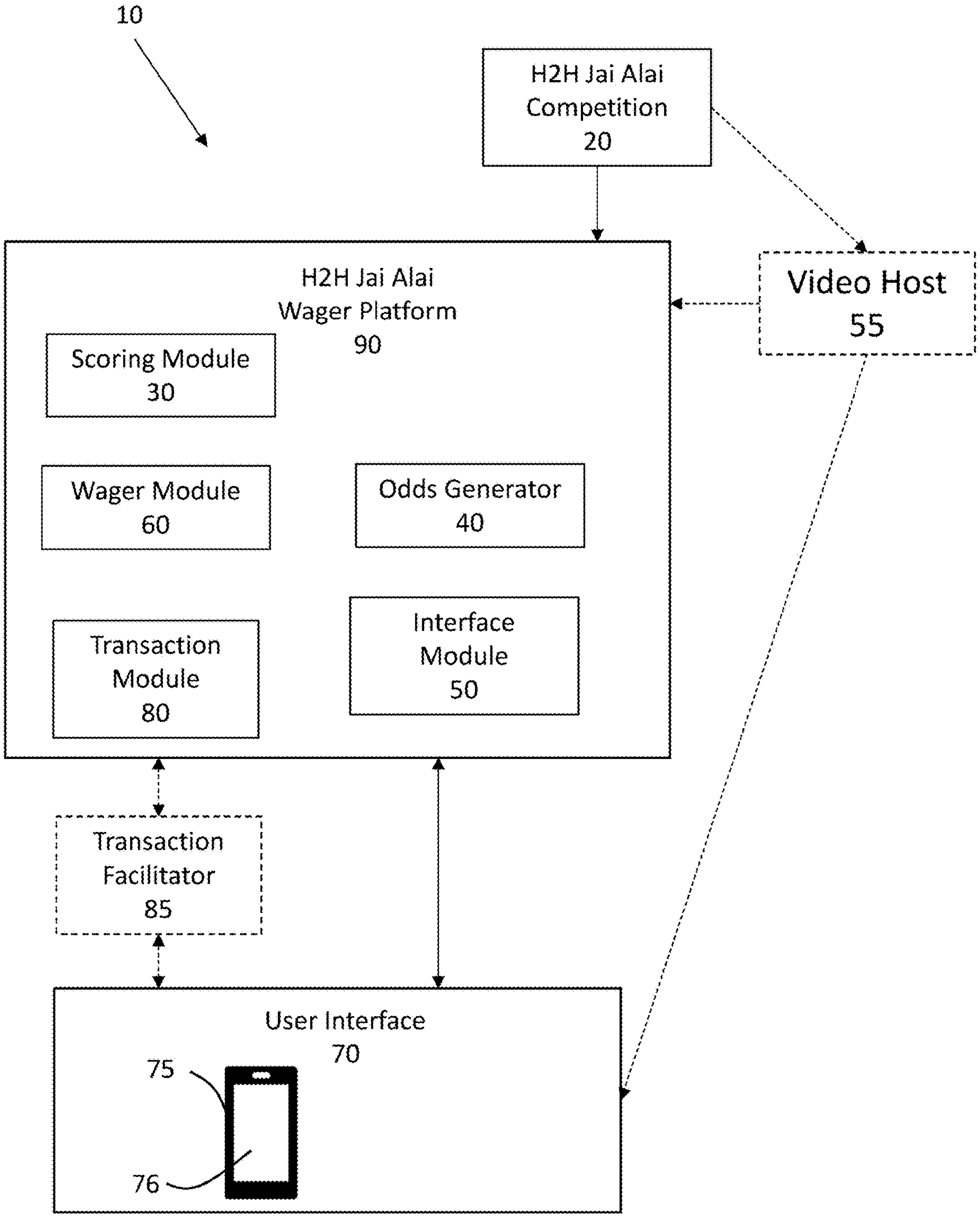
FIG. 4 schematically illustrates various features of a H2H jai alai wagering system including a H2H jai alai wager servicing subsystem according to various embodiments described herein.

With further reference to FIG. 4, the H2H jai alai wagering system 10 components described with respect to FIG. 3 may be associated with a H2H jai alai wager platform 90 for interfacing users to H2H jai alai competition and associated wagers via the user interface 70. Additionally or alternatively, a participating sportsbook may include a H2H jai alai wager platform 90 that is provided with one or more of the outputs, processing, or other data and functionalities of the H2H jai alai wagering system 10. For a scoring module 30, odds generator 40, interface module 50, or transaction module 80. While shown outside the H2H jai alai wager platform 90, in some embodiments, H2H jai alai wager platform 90 the H2H may include a video host 55 and/or transaction facilitator 85. In other embodiments, the H2H jai alai wagering system 10 may not include a video host 55 or transaction facilitator. As described above with respect to FIG. 3, a video host 55 may be configured to provide video data directly to user interfaces 70 or may provide video data to the interface module 50. As also described above with respect to FIG. 3, a transaction facilitator may communicate with the transaction module 80, user interface 70, or both to facilitate wager related transactions. According to various embodiments, the H2H wager platform may receive display data and other data transmitted to the user interface 70 as described above and elsewhere here. In one example, the interface module 50, as depicted in FIG. 3, a H2H jai alai wager platform 90 or interface module 50 thereof, may be associated with a participating sportsbook includes an include a server, e.g., application server, webserver, application, e.g., smartphone applications, web application, or the like.

As introduced above, during the H2H jai alai competition 20, the scoring module 30 may collect scoring related data and supply the scoring related data to the odds generator 40 for generation of odds in real time, while the match is being played. In some embodiments, the scoring module 30 may also transmit scoring related data to one or both of the interface module 50 and/or wager module 60 in real time, while the match is being played. The scoring related data may be collected at or in the area of the H2H jai alai competition 20 and in some instances may include capturing video data of the H2H jai alai competition 20 and analyzing the video data alone or together with onsite observation. Video data may be analyzed onsite or remotely. Scoring related data may include, for example, identification of score, scores, and scoring events and may also include other play events and/or play situations occurring during the H2H jai alai competition 20. For example, the scoring related data may include a current score of a set and/or match, player/team serving or having control of the ball, play-by-play, point play situation, personnel/personnel changes, injuries, scores on point play, faults, identification of score event such as two bounces, out of bounds, holding the ball, juggling the ball, interference/foul, failed serve (first or second, as the case may be), and the like.

In some embodiments, in addition to scoring data related to scoring and other play events and/or play situations during the H2H jai alai competition 20, the scoring related data may include other information related to the H2H jai alai competition 20 useful for generating odds such as skill levels, past performances, player/team stats or metrics. This information may be provided or transmitted to the odds generator 40 by the scoring module 30 prior to play or in-game. In some embodiments, the odds generator 40 generates such other information based on previous scoring related data provided or transmitted by the scoring module 30.

The interface module 50 may generate graphical displays for presentation at a user interface 70, such as a location of the H2H jai alai competition 20, a sportsbook or H2H jai alai wager platform 90 remote to the H2H jai alai competition 20, and/or user devices via an application or website. In various examples, the user device 75 may include a display 76 comprising a television, projector, kiosk, computer, tablet, or the like configured to display the graphical display content.

The odds generator 40 will typically be remote but, in some embodiments, all or a portion of the odds generator 40 and operations thereof may be onsite with respect to the H2H jai alai competition 20. The odds generator 40 may be configured to set a wagering line at the beginning or prior to a match. This wagering line and other odds for a plurality of additional wager options may be continuously recalculated during play to provide up-to-the-minute odds for presentation to and interaction with users, giving users opportunity to access real time odds and place timely wagers, with all available information at-hand, and heightening interest and depth of understanding of the competitive dynamics of H2H jai alai competition 20. The wager options may include first player/team to score in a particular set; player/team winner of first set or specific set; player/team winning consecutive sets; number of sets played in the match; final set distribution of the match; over/under number of sets played, number of sets won by a player/team, score of a set, cumulative scores of multiple sets, or the like.

During the H2H jai alai competition 20, the wager module 40 may generate odds for wager options as they arise. For example, for a current point-play, the wager module 40 may generate odds for a wager with respect to whether a point will be awarded, player/team the point is awarded to, how the point will be achieved, first bounce line of the point play serve, highest or lowest line of a bounce or return in the point play, or other situational outcomes.

As introduced above with respect to FIG. 3, the interface module 50 may receive odds data transmitted from the odds generator 40. In some embodiments of the H2H jai alai wagering system 10, the interface module 50 may also receive one or more of video data, or wager data. The interface module 50 may generate display data suitable for presentation by the user interface 70, e.g., edit and/or reformat the video data, scoring related data, odds data, and/or wager data.

The odds generator 40 may be configured with one or more algorithms that receive the scoring related data and output odds associated data with respect to estimated probabilities. The algorithms may generate probabilities based on participating players and/or teams, such as their relative skill level, past performances, and injuries. The algorithms may also consider non-probability based factors such as balance of betting action, e.g., cumulative amount bet on a particular wager option, groups of wager options, total pending wagers, net collected and retained with respect to completed wagers based on an event, period of time period for completed bets or grouping of bets, or the like. In some configurations, the algorithms may incorporate rules associated with non-probability based factors as described above and elsewhere herein specific to a participating sportsbook or sportsbook platform. Non-probability based factors may include, for example, adjusting probabilities and associated wager amounts and payouts to provide the H2H jai alai wagering system 10, which may include participating sportsbooks or sportsbook platforms, an over-round. The over-round may be included in rules particular to participating sportsbooks and sportsbook platforms.

In some embodiments of the H2H jai alai wagering system 10, the interface module 50 may receive odds data 45 from the odds generator 40. The odds data may include real time odds. The odds data may be incorporated into the display data and may be displayed together with or separately of display data corresponding to video data of the H2H jai alai competition 20. For example, the interface module 50 may transmit a video data portion of the display data separately, within a separate data stream, encoded separately, available via a separate server or file address, or the like.

In various embodiments of the H2H jai alai wagering system 10, the interface module 50 may receive wager requests from the wager module 60 for incorporation into the display data. For example, the wager module 70 may transmit data associated with current or past wagers, winners and/or winnings to the interface module 50 for presentation to users on the user interface 70. In some embodiments, the display may include wager volume with respect to one or more bets associated with the match, season, or tournament. In a further or another embodiment, the display may include a name or nickname/username of a user along with user account information, user account balance, an amount won, particular wagers won, cumulative winnings for a specified period of time, such as a day, week, month year, or lifetime, cumulative winnings for a particular H2H jai alai event, tournament, season, day, week, month, year, or lifetime. In any of the above embodiments or another embodiment, the display may include a presentation of rankings of players with respect to an amount won, wager won, cumulative winnings for a specified period of time, such as a day, week, month year, or lifetime, cumulative winnings for a particular H2H jai alai event, tournament, season, day, week, month, year, or lifetime. A display of winners, for example, may provide notoriety of the skills of users and encourage future user participation.

As introduced above, in various embodiments of the H2H jai alai wagering system 10, the user interface 70 may include one or more interactive components configured to allow a user to interact with the system, e.g., navigate through the plurality of wager options, select wager options, enter wager amounts, specify wager payment and/or payout accounts, specify transaction facilitators 85, or the like. The user device 75 may generally include a display 76 for outputting the interactive display generated by the interface module 50. While the term display 76 is used herein, it is to be understood that a display 76 may include a display screen of a computer, laptop, tablet, smart phone, PDA, television, projector, dedicated device, or another suitable display screen. The display 76 is not limited to a screen and may incorporate various display technologies such as liquid crystal display (LCD), light-emitting diode (LED) display, plasma (PDP) display, quantum dot (QLED) display, hologram display, electroluminescent (ELD) display, or other display technology. The user device 75 may also include a processor for processing code or instructions associated with the display data for generating the interactive display on the display 76.

In various embodiments of the H2H jai alai wagering system 10, the interface module 60 may comprise a webserver or application server configured to execute or provide system data and functionalities to user devices 75 within an application, such as a smart phone application or web application, website, or video production center wherein odds and wagers may be formatted, coded, or otherwise processed for presentation at the user interface 70. The interface module 50 may include a server, webserver, cloud environment, or the like including a processor and data storage medium that stores instructions.

In one embodiment, the wager selection and wager amount provided by a user operates as a request and the wager module 60 may accept or deny the wager. For example, the wager module 60 may compare the selected wager, including the subject odds associated with the wager selection, with current odds. If the selected wager has been the subject of updated odds or if the proposed wager amount or current action on the selected wager is undesirable, the wager module 60 may reject the wager request. The wager module 60 may similarly accept the wager request even if the odds have been updated. In some embodiments, odds may be updated and be associated with a time period or an occurrence of a game event in which the updated odds are valid and subject to wagering based on the updated odds. An example occurrence or event may include a next serve, completion of set, a particular score, initiation of a next set or match, or the like. In one embodiment, the wager request includes a payment authorization. The payment authorization may be automatically linked to the request when the user is logged into a funded user account having sufficient funds that may be debited to cover the wager. The transaction module 80 may utilize the authorization to debit the user account or otherwise transfer the wagered funds. Additionally or alternatively, the request may include a payment authorization including a credit card number, bank account, or information corresponding to instructions and/or account information with respect to a transaction facilitator 85 such that the transaction module 80 executes the transfer of the wagered funds using the transaction facilitator 85.

With further particular reference to FIGS. 5-9, n various embodiments, the H2H jai alai wagering system 10 and associated components described above, e.g., with respect to FIGS. 3 & 4, and elsewhere herein may include as a H2H jai alai wager servicing subsystem 15 wherein one or more outputs, processes, data streams, or functionalities, or other data and functionalities of the H2H jai alai wagering system 10 are provided to one or more H2H jai alai wager platform 90. H2H jai alai wager platform 90 may include participating sportsbooks or sportsbook platforms that service wagers associated with the H2H jai alai competition 20. H2H jai alai wager platform 90 may comprise servers (e.g., application servers, webservers), applications (e.g., smartphone applications, web applications), sportsbook facilities, or other structure configured to provide interactive H2H jai alai wagering platforms associated with the H2H jai alai competition 20. In some embodiments, the H2H jai alai wager servicing subsystem 15 includes a digital wagering service for a plurality of digital H2H jai alai wager platforms 90. While, in some embodiments, the scoring module 30, odds generator 40, interface module 50, wager module 60, and/or transaction module 80 may be configured to provide customized scoring related data, odds data, display data, or wager services, transaction services, respectively, for a plurality of H2H jai alai wager platforms 90, H2H jai alai wager platforms 90 may include one or more of a scoring module 30, odds generator 40, interface module 50, wager module 60, and/or transaction module 80 configured to provide customized scoring related data, odds data, display data, wager services, or transaction services, respectively, for use by the platform 90. H2H jai alai wager platforms 90 may select one or more services from the subsystem, such as receiving raw or processed scoring related data, odds data, display data, wager request servicing, or wager transaction servicing. The H2H jai alai wager servicing subsystem 15 may include all such services, but may provide different combinations of such services to different H2H jai alai wager platforms 90. However, in some embodiments, the H2H jai alai wager servicing subsystem 15 does not provide all such services. Thus, the H2H jai alai wager servicing subsystem 15 may provide an improved mechanism for supporting H2H jai alai wagering by providing one or more services or products to H2H jai alai wager platforms 90. For example, the H2H jai alai wager servicing subsystem 15 may include a scoring module 30, as described herein, that provides scoring related data. The scoring module 30 may provide raw or process scoring related data. For example, the scoring module 30 may process the scoring related data into a format desired for an odds generator 40 and/or wager module 60, one or both of which may be part of the H2H jai alai wager servicing subsystem 15 for H2H jai alai wager platform 90. The H2H jai alai wager platforms 90 may select all or portions of the service to achieve a desired level of autonomy. For example, a H2H jai alai wager platform 90 wishing for a turnkey wagering platform for users to wager on H2H jai alai may utilize scoring, odds making, wagering, transaction, and interface generation services. Some H2H jai alai wager platforms 90 may desire to modify presentation of the data received from the subsystem and thus may further edit display data, e.g., to include branding, change display structure or layout, display the data within user accounts of a participating sportsbook, such as a participating sportsbook associated with the H2H jai alai wager platform 90, or adjust odds to conform with the particular risk level, betting balance for particular wagers or groups of wagers it is servicing, or other adjustments desired by an associated participating sportsbook. Other H2H jai alai wager platforms 90 may desire to generate display data separate from the H2H jai alai wager servicing subsystem 15 and, therefore, may receive scoring related data from the H2H jai alai wager servicing subsystem 15 and integrate the scoring related data with odds data-which may be received from the H2H jai alai wager servicing subsystem 15 or a odds generator 40 associated with the H2H jai alai wager platform 90—to generate an interactive display data with an interface module 50 associated with the H2H jai alai wager platform 90.

In various configurations, a H2H jai alai wager platform 90 may request scoring related data from the scoring module 30, generate odds for a plurality of wager options with an odds generator 40 associated with the H2H jai alai wager platform 90, transmit the odds data to an interface module 50 for generation of an interactive display integrating the odds data into an interactive display for presentation to users at a user interface 70. As noted above, the interface module 50 may be associated with the H2H jai alai wager servicing subsystem 15 or H2H jai alai wager platform 90, depending on the configuration. Users may interact with the display, which may be customized to the H2H jai alai wager platform 90 wherein users are unaware of the background services provided by the H2H jai alai wager servicing subsystem 15.

In some configurations, the H2H jai alai wager servicing subsystem 15 may provide wager servicing to H2H jai alai wager platforms 90. Thus, the wager module 60 may facilitate or service wagers from a plurality of H2H jai alai wager platforms 90. The wager module 60 may be configured to accept wagers from users through user devices 75 and direct fund transfers from user accounts to a participating sportsbook or platforms, e.g., H2H jai alai platforms 90, through which users place the wager. The wager module 60 may similarly direct winner payouts to user accounts via the transaction module 80, which may be provided as part of the H2H jai alai wager servicing subsystem 15 or handled through the H2H jai alai wager platform 90. Thus, the H2H jai alai wager servicing subsystem 15 may provide for structuring and facilitating wagering on H2H jai alai competitions 20 for a plurality of sportsbooks or associated H2H jai alai wager platform 90. As noted above, in various embodiments, wager related transactions may be handled by a transaction module 80, either as part of the service or inhouse by the H2H jai alai wager platform 90. In various embodiments, wager funds or account funding may be transacted via credit card, cash, and/or digital fund transfers. Transactions may include fund transfers into or out of H2H jai alai wagering system 10 or participating sportsbook or H2H jai alai wager platform 90 accounts and accounts of users. Such accounts may be maintained by the H2H jai alai wagering system 10, H2H jai alai wager servicing subsystem 15, participating sportsbooks, H2H jai alai wager platforms 90, users, or third-parties. Fund transfers may include direct payments via credit card, cash, or digital fund transfer. In some embodiments, a user may establish an account with the H2H jai alai wagering system 10, H2H jai alai wager servicing subsystem 15, a participating sportsbook, or a H2H jai alai wager platform 90. The user may fund the account using a credit card, cash, bank check, personal check, electronic fund transfer, or the like. Transactions may be facilitated by a transaction facilitator 80 as described herein. Fund transfers for wager related transactions may include crediting or debiting user accounts held by a participating sportsbook 90, H2H jai alai wagering system 10, or third-party. In an above or another embodiment, the wager module 60, via the transaction module 80, may transfer winning payouts automatically upon receipt of scoring related data corresponding to the particular outcome underlying the wager to thereby complete the wager. The user may hold a funded or non-funded user account with the H2H jai alai wagering system 10, H2H jai alai wager servicing subsystem 15, participating sportsbook, or H2H jai alai wager platform 90. The transaction module 80 may credit the user account or transfer the funds to an outside account specified by the user at the time of requesting the wager or otherwise, such as specified in the user account or upon request by the transaction module 80 within a notification of a winning wager.

Figure 5:
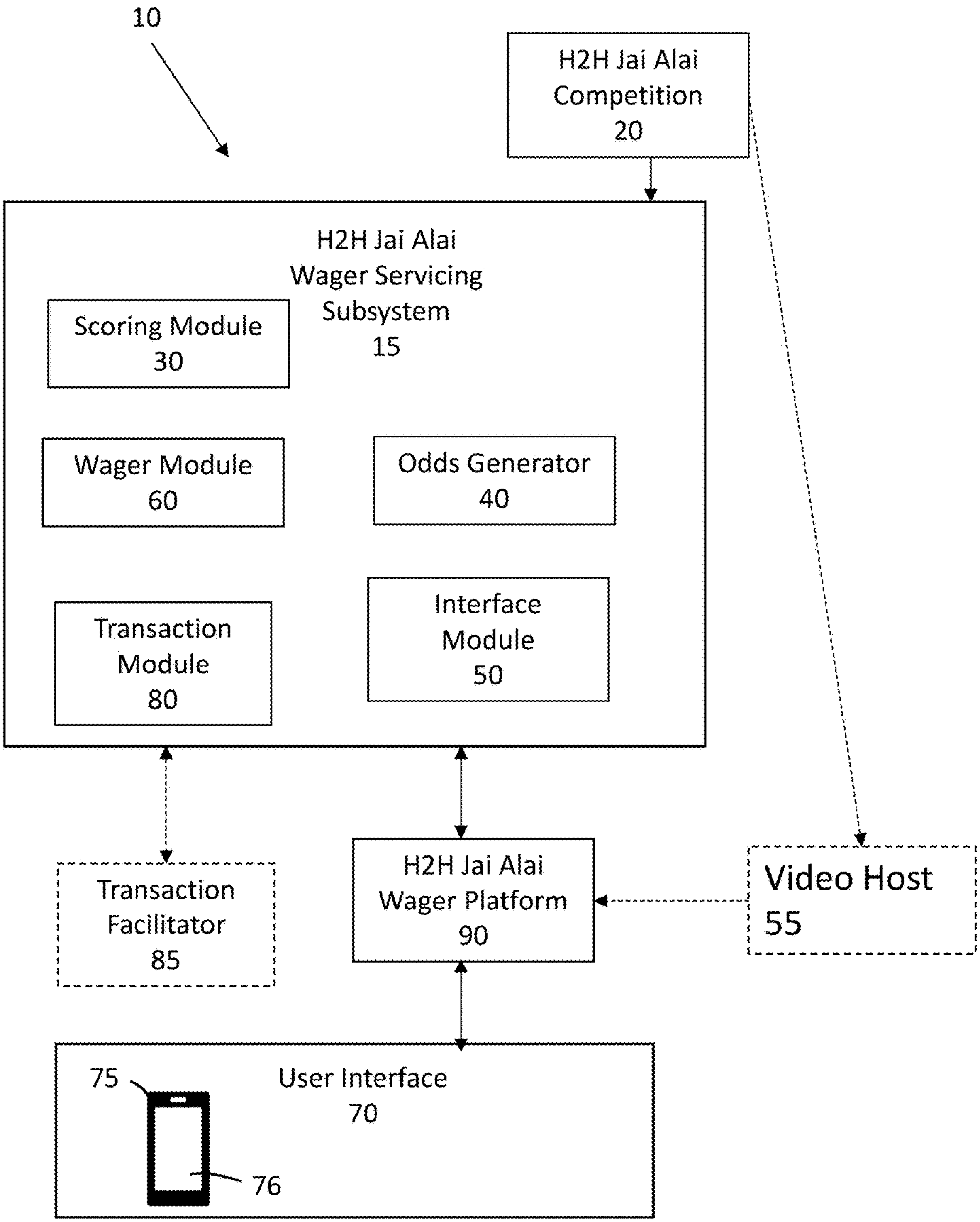
FIG. 5 schematically illustrates various features of a H2H jai alai wagering system including a H2H jai alai wager servicing subsystem and H2H jai alai wager platform according to various embodiments described herein.

In the configuration shown in FIG. 5, the H2H jai alai wager servicing subsystem 15 includes a scoring module 30 configured to collect and/or process scoring related data, an odds generator 40 configured to utilize the score related data to generate odds for a plurality of wager options, an interface module 50 configured to generate an interactive display incorporating the odds data with the plurality of wager options for interaction with users, a wager module 60 configured to process wagers requests from users interacting with the display, and a transaction module 80 configured to process wager related transactions. It is to be appreciated that in some embodiments, odds data may be generated and/or incorporated into the interactive display for single wagers, as such, the odds generator 40 or interface module 50 need not generate odds or integrate odds with respect to multiple wager options to be within the contemplation of the present disclosure. The operations of the H2H jai alai wager servicing subsystem 15 components may include any combination of those described herein with respect to the respective components. The outputs and services of the components of the H2H jai alai wager servicing subsystem 15 may be provided as products and services to the H2H jai alai wager platform 90. These products and services may be provided as turnkey operation for a participating sportsbook. As noted above, the H2H jai alai wager platform 90 may be configured with additional functionalities with respect to score collection and analysis, odds generation, wager processing, wager transaction processing, and/or generation of display data, to further customize the H2H jai alai wager platform 90.

While shown outside the platform in FIG. 5, in some embodiments, the H2H jai alai wager servicing subsystem 15 may include one or more of a video host 55 or transaction facilitator 85. In another or a further embodiment, the video host 55 may provide video data to the H2H jai alai wager servicing subsystem 15 and/or user interface 70, in addition to or instead of the H2H jai alai wager platform 90. In other embodiments, the H2H jai alai wager system does not include a video host 55 or transaction facilitator 85.

Figure 6:
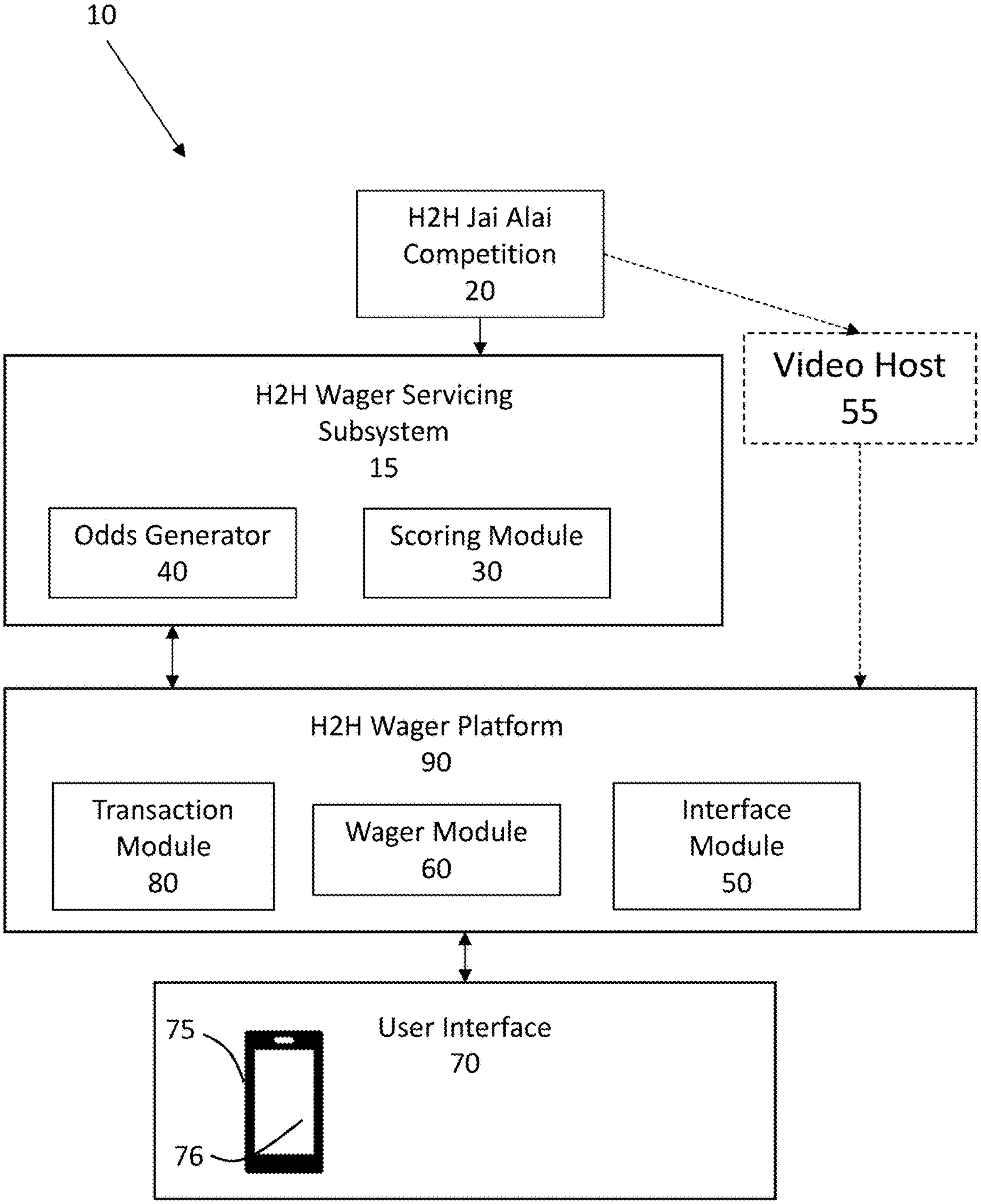
FIG. 6 schematically illustrates various features of a H2H jai alai wagering system a H2H jai alai wager servicing subsystem and H2H jai alai wager platform according to various embodiments described herein.

The H2H jai alai wagering system 10 may comprise a flexible wagering service wherein one or more H2H jai alai wager platform 90 may receive any combination of system products data streams and/or services from the H2H jai alai wager servicing subsystem 15 and be further configured to include remaining data generation and functionalities to provide H2H jai alai wagering as described herein. FIG. 6 illustrates a configuration of the H2H jai alai wagering system 10 including a H2H jai alai wager servicing subsystem 15 configured to provide H2H jai alai wagering services to an H2H jai alai wager platform 90. The H2H jai alai wager servicing subsystem 15 includes an odds generator 40 configured to generate odds data and a scoring module 30 configured to provide scoring related data. The odds and scoring related data products may be utilized by the H2H jai alai wager platform 90 to provide H2H jai alai wagering as described herein. For example, the H2H jai alai wager platform 90 is configured with wager, transaction, and interface generation capabilities, which may be specialized for the H2H jai alai wager platform 90. For example, an interface module 50 may be configured to integrate the odds data with a plurality of wager options as described above and elsewhere herein. The associated display provided to the user interface 70 may be specific or customized to the H2H wager platform, e.g., to include branding, display structure or layout, display within user accounts of a participating sportsbook, such as a participating sportsbook associated with the H2H jai alai wager platform 90, or adjust odds to conform with the particular risk level, betting balance for particular wagers or groups of wagers it is servicing, or other adjustments desired by an associated participating sportsbook. The wager module 60 may be configured to handle wager requests. The wager module 60 may also be configured to perform one or more other operations of the wager module 60 described herein, such as identify winning or completed wagers, provide accountings, or the like. The transaction module 80 may be configured to handle wager related transactions as described herein. When included, a video host 55 may provide video data to the H2H jai alai wager platform 90 or user interface 70. In some embodiments, the H2H jai alai wagering system 10 may include or incorporate functions of a transaction facilitator 80 as described herein. In various embodiments, the H2H jai alai wager servicing subsystem 15 may include additional modules and associated functionalities, such as those described herein, to provide various combinations of H2H jai alai wagering services to additional H2H wager platforms.

Figure 7:
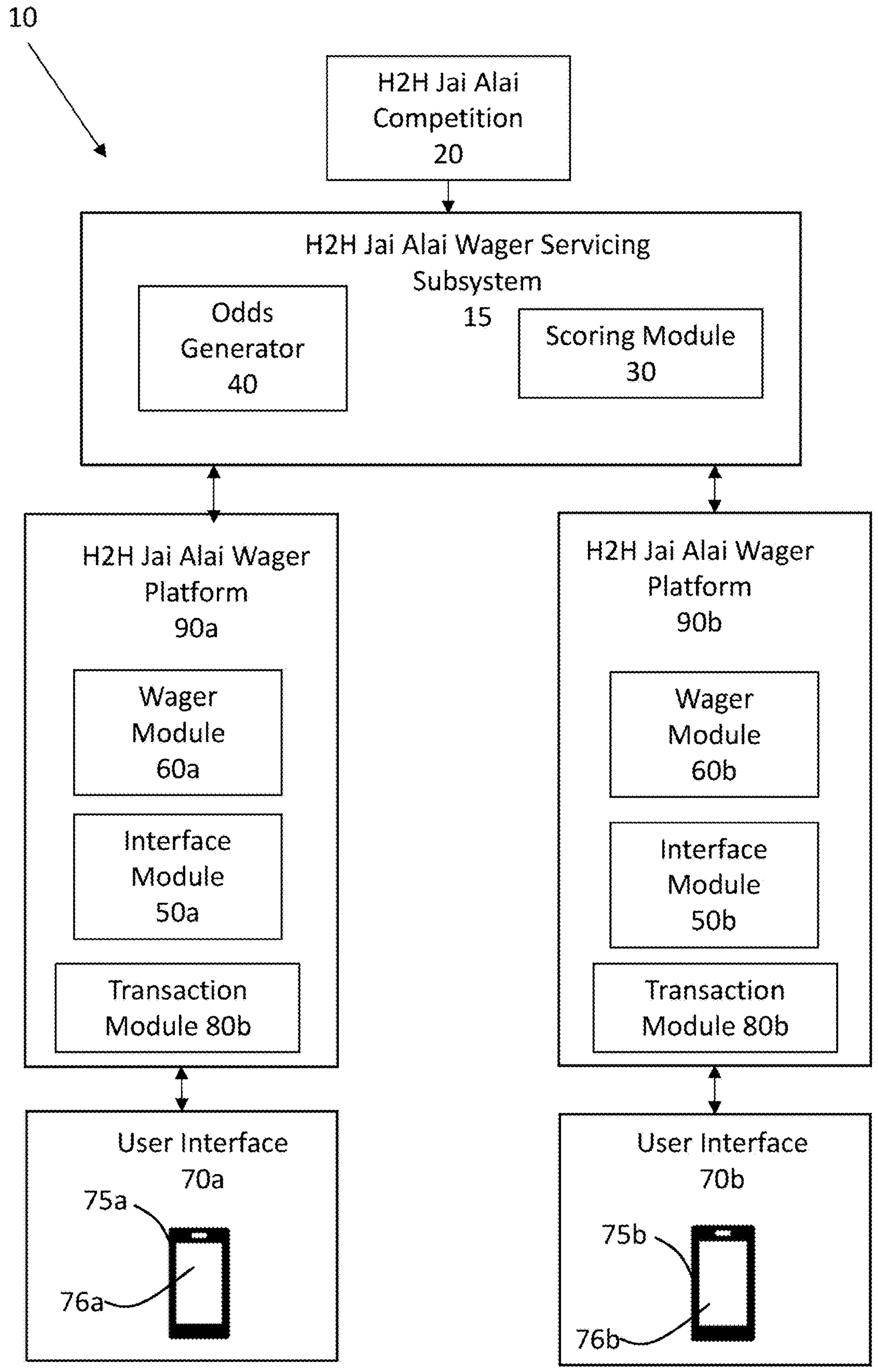
FIG. 7 schematically illustrates various features of a H2H jai alai wagering system a H2H jai alai wager servicing subsystem and H2H jai alai wager platform according to various embodiments described herein.
Figure 8:
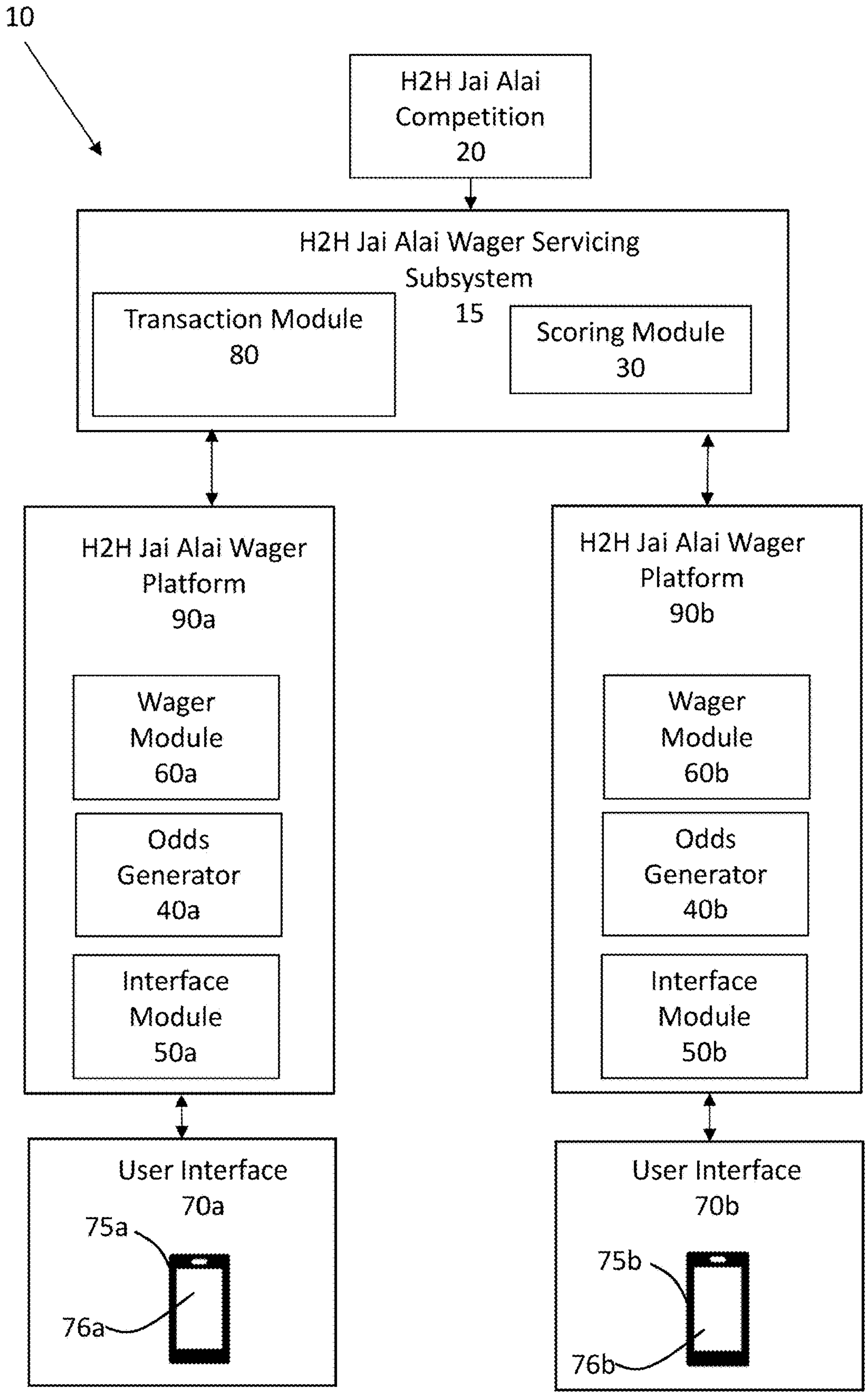
FIG. 8 schematically illustrates various features of a H2H jai alai wagering system a H2H jai alai wager servicing subsystem and H2H jai alai wager platform according to various embodiments described herein.
Figure 9:
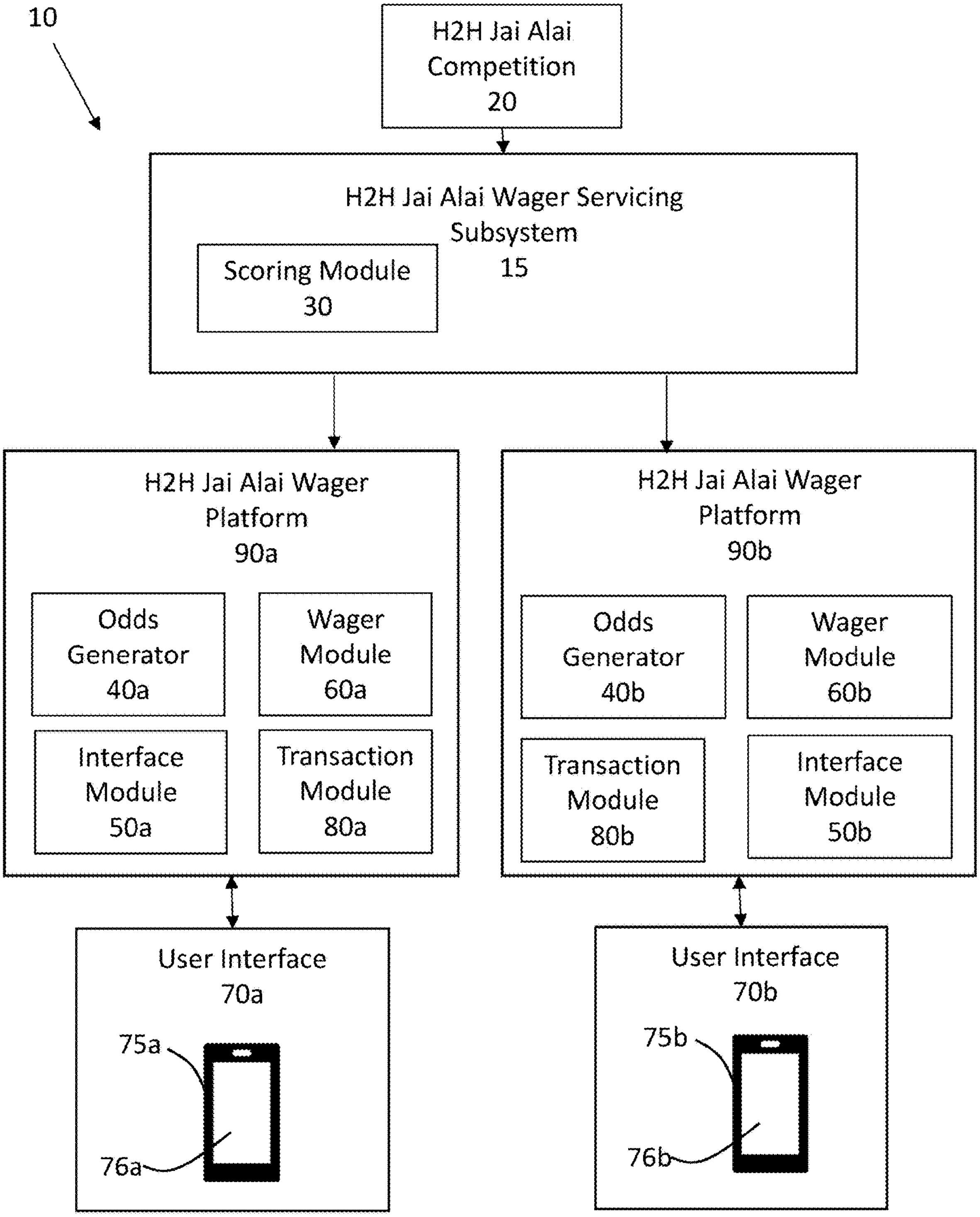
FIG. 9 schematically illustrates various features of a H2H jai alai wagering system a H2H jai alai wager servicing subsystem and H2H jai alai wager platform according to various embodiments described herein.

As introduced above, and with particular reference to FIGS. 7-9, the H2H jai alai wager servicing subsystem 15 may provide H2H jai alai wagering services to multiple H2H jai alai wager platforms 90*a*, 90*b*. In FIG. 7, the H2H jai alai wager servicing subsystem 15 is shown to include the scoring module 30 and odds generator; in FIG. 8, the H2H jai alai wager servicing subsystem 15 is shown to include the scoring module 30 and transaction module 80; and in FIG. 9, the H2H jai alai wager servicing subsystem 15 is shown to include the scoring module 30. However, the H2H jai alai wager servicing subsystem 15 may include additional modules and generators to provide different combinations of H2H wagering services to other H2H wager platforms and/or user interfaces. Additionally, while the H2H jai alai wager platforms 90*a*, 90*b* in FIGS. 7-9 are shown as having the same module configurations and utilizing the same H2H wagering services, in various embodiments, different combinations of H2H wagering services may be provided to different H2H jai alai wager platforms 90*a*, 90*b* by the H2H jai alai wager servicing subsystem 15.

FIG. 7 illustrates a configuration similar to FIG. 6 wherein the H2H jai alai wager servicing subsystem 15 provides H2H wager services including odds generation and scoring for multiple H2H jai alai wager platforms 90*a*, 90*b*. For example, the H2H jai alai wager servicing subsystem 15 includes an odds generator 40 configured to generate odds data and a scoring module 30 configured to provide scoring related data. The H2H jai alai wager platforms 90*a*, 90*b* are configured with wager, transaction, and interface generation capabilities, which may be specialized for the H2H jai alai wager platforms 90*a*, 90*b*. For example, the interface modules 50*a*, 50*b* may be configured to integrate the odds data with a plurality of wager options, as described above and elsewhere herein. The associated display provided to the user interfaces 70*a*, 70*b* for presentation with a display 76*a*, 76*b* of a user device 75*a*, 75*b* may be specific or customized to the H2H jai alai wager platforms 90*a*, 90*b*, e.g., to include branding, display structure or layout, display within user accounts of a participating sportsbook, such as a participating sportsbook associated with the H2H jai alai wager platforms 90*a*, 90*b*, or adjust odds to conform with the particular risk level, betting balance for particular wagers or groups of wagers it is servicing, or other adjustments desired by an associated participating sportsbook. The wager modules 60*a*, 60*b* may be configured to handle wager requests. The wager modules 60*a*, 60*b* may also be configured to perform one or more other operations of wager modules 60*a*, 60*b* described herein, such as identify winning or completed wagers, provide accountings, or the like. The transaction modules 80*a*, 80*b* may be configured to handle wager related transactions as described herein. While not shown, in one embodiment, a video host 55 may be included to provide video data to the H2H jai alai wager platforms 90*a*, 90*b* or user interfaces 70*a*, 70*b*. In some embodiments, the H2H jai alai wagering system 10 may include or incorporate functions of one or more transaction facilitators 80, as described herein. In various embodiments, the H2H jai alai wager servicing subsystem 15 may include additional modules and associated functionalities, such as those described herein, to provide various combinations of H2H jai alai wagering services to additional H2H wager platforms.

FIG. 8 illustrates a configuration of the H2H jai alai wagering system 10 including a H2H jai alai wager servicing subsystem 15 configured to provide H2H jai alai wagering services to an H2H jai alai wager platform 90. The subsystem 15 includes a scoring module 30 to collect score related data and transmit it to the H2H jai alai wager platforms 90*a*, 90*b*. The H2H jai alai wager platforms 90*a*, 90*b* include wager modules 60*a*, 60*b* configured to utilize the score related data to generate real time odds for a plurality of wager options. The wager modules 60*a*, 60*b* may generate the odds using additional data specific to the respective H2H jai alai wager platforms 90*a*, 90*b* or associated sportsbook, as described in more detail elsewhere herein. The H2H jai alai wager platforms 90*a*, 90*b* include interface modules 50*a*, 50*b* configured to generate display data including the real time odds for the plurality of wager options for presentation on a user device 75*a*, 75*b* of a user interface 70*a*, 70*b*. Users may interact with the display to request wagers. Wager modules 60*a*, 60*b* may receive and process the wager requests. In this configuration, the subsystem provides transaction servicing. For example, the wager module 60*a*, 60*b* may request transaction servicing from the transaction module 80, as described herein and which may include wager payment funding, payouts to winners, and/or accounting services. For example, the transaction module 80 may process transactions directly with users and the platform, may establish or access accounts for crediting and debiting wager related transactions, may use a transaction facilitator, or the like. Thus, the H2H jai alai wager servicing subsystem 15 may provide a backend system for providing H2H jai alai wagering wherein by score related data is provided to H2H jai alai wager platforms 90*a*, 90*b* and H2H jai alai wager platforms 90*a*, 90*b* may handle and process the data to generate odds within an interactive display. H2H jai alai wager platforms 90*a*, 90*b* may transmit wager requests or transactions related to wager requests to the H2H jai alai wager servicing subsystem 15 for handling the transactions. This arrangement allows H2H jai alai wager platforms 90*a*, 90*b* to control and customize odds generation and data presentation while handing off scoring collection and transaction processing. In some embodiments, the H2H jai alai wager servicing subsystem 15 maintains accounts for H2H jai alai wager platforms 90*a*, 90*b* and users and may credit and debit such accounts to simply accounting on behalf of H2H jai alai wager platforms 90*a*, 90*b*. In one embodiment, users may have accounts established with the H2H jai alai wager servicing subsystem 15 and the transaction module 80 may allow simplified wager related transactions for a plurality of H2H jai alai wager platforms 90*a*, 90*b*, allowing users to shop around for the most desirable odds from participating sportsbooks or associated H2H jai alai wager platforms 90*a*, 90*b*. Wager related transactions may be executed from a single account on behalf of the user for a plurality of H2H jai alai wager platforms 90*a*, 90*b*. Such an arrangement limits distribution of sensitive information of the user, reduces liability for maintaining such sensitive information, reduces accounting and regulatory burdens on participating sportsbooks, and fosters competition between the participating sportsbooks to provide desirable odds. In other embodiments, the H2H jai alai wager servicing subsystem 15 may also provide odds generation services and/or wager request servicing as described herein.

FIG. 9 illustrates a configuration of the H2H jai alai wagering system 10 including a H2H jai alai wager servicing subsystem 15 configured to provide H2H jai alai wagering services to an H2H jai alai wager platform 90. The H2H jai alai wager servicing subsystem 15 includes a scoring module 30 to collect score related data and transmit it to the H2H jai alai wager platforms 90*a*, 90*b*. The H2H jai alai wager platforms 90*a*, 90*b* include wager modules 60*a*, 60*b* configured to utilize the score related data to generate real time odds for a plurality of wager options. The wager modules 60*a*, 60*b* may generate the odds using additional data specific to the respective H2H jai alai wager platforms 90*a*, 90*b* or associated sportsbook, as described in more detail elsewhere herein. The H2H jai alai wager platforms 90*a*, 90*b* include interface modules 50*a*, 50*b* configured to generate display data including the real time odds for the plurality of wager options for presentation on a user device 75*a*, 75*b* of a user interface 70*a*, 70*b*. Users may interact with the display to request wagers. Wager modules 60*a*, 60*b* may receive and process the wager requests. Transaction modules 80*a*, 80*b* are included to provide transaction servicing. For example, wager modules 60*a*, 60*b* may request transaction servicing from the respective transaction modules 80*a*, 80*b*, as described herein and which may include wager payment funding, payouts to winners, and/or accounting services. For example, the transaction modules 80*a*, 80*b* may process transactions directly with users and the H2H jai alai wager platforms 90*a*, 90*b*, may establish or access accounts for crediting and debiting wager related transactions, may use a transaction facilitator, or the like. Thus, the H2H jai alai wager servicing subsystem 15 may provide a backend system for providing H2H jai alai wagering wherein by score related data is provided to H2H jai alai wager platforms 90*a*, 90*b* and H2H jai alai wager platforms 90*a*, 90*b* may handle and process the data to generate odds within an interactive display, receive and process wager request, and conduct wager related transactions. This arrangement allows H2H jai alai wager platforms 90*a*, 90*b* to control and customize odds generation, data presentation, and wager transaction processing, while handing off scoring collection. In some embodiments, the H2H jai alai wager platforms 90*a*, 90*b* maintains accounts for users and may credit and debit such accounts.

While FIGS. 7-9 do not depict a video host 55 or transaction facilitator 86, in some embodiments, the H2H jai alai wagering system 10, H2H jai alai wager servicing subsystem 15, or H2H jai alai wager platforms 90*a*, 90*b* include or incorporate a video host 55 and/or transaction facilitator 86 as described above and elsewhere herein.

With general reference again to FIGS. 3-9, the H2H jai alai wager platforms 90 may interface with H2H jai alai wager servicing subsystem 15 comprising one or more of a scoring module 30, odds generator 40, interface module 50, or transaction module 80. While shown outside the platform, in some embodiments, the H2H jai alai wager servicing subsystem 15 may include a video host 55 and/or transaction facilitator 85. According to various embodiments, the H2H wager platform may receive display data and other data transmitted to the user interface 70 as described above and elsewhere here.

In various embodiments, the H2H jai alai wager platform 90 may be configured to separately receive, retrieve, or request odds related data portions of the display data, e.g., upon receiving a request from a user for such data portions at the user interface 70. The interface module 50 may edit and/or format odds data portions for display by the user interface 70. When the wager module 60 does not generate odds universally, such that all H2H jai alai wager platforms are not using the same odds, the interface module 50 may label, designate, and/or transmit odds data portions to respective particular H2H jai alai wager platforms 90. In this or another example, the odds generator 40 may label, designate, and/or transmit odds data to designated user interfaces 70.

In some embodiments, prior to making a wager request, a user may be required to fund an account with H2H jai alai wagering system 10, H2H jai alai wager servicing subsystem 15, participating sportsbooks, or H2H jai alai wager platforms 90 such an account whereby the transaction module 80 may deduct or transfer wagered funds from the user account upon placement of a wager. Upon determination that a user has successfully won a wager, the wager module 60 may direct payment to the user, e.g., credit or transfer winnings to the user account. Wager and winner payout funds may be digitally transferred to and from user accounts using a transaction facilitator 80, as described above and elsewhere herein. When the transaction module 80 is providing transaction services for a participating sportsbook or H2H jai alai wager platform 90, the transaction module 80 may transfer funds to the participating sportsbook or H2H jai alai wager platform 90 when a user places a wager or may hold the funds until the wager is determined to be complete. The transaction module 80 may transfer funds for completed wagers individually, in groups, at periodic time periods, at the conclusion of an event, upon reaching a predetermined holding account balance or at other times determined by the parties.

The wager module 60 or participating sportsbook or H2H jai alai wager platform 90 through which the wager is to be made may handle wager fund transfers and/or winning payouts, which may include coordination with the transfer module 80. For example, the wager module 60 may act as a facilitator for participating sportsbooks or H2H wager platforms 90 and provide wager data to the same. The sportsbook or H2H jai alai wager platform 90 may enter related wager data into a ledger credit to track the action. In another example, the wager module 60 handles wager tracking and/or fund transfers, with the transaction module 80, for one or more participating sportsbooks or H2H jai alai wager platforms 90. On a periodic or event basis, the wager module 60 may provide the participating sportsbook an accounting of the wagers, which may include identification of wagers made, pending, completed, wager funds received, wager funds paid out, outstanding wager liability, or the like.

Communication, e.g., data exchange, between the H2H jai alai wager platform 90 and H2H jai alai wager servicing subsystem 15 may be accomplished via network data communication or other suitable communication route. In one configuration, one or more system data streams or functionalities of the H2H jai alai wager servicing subsystem 15 may be provided to the H2H jai alai wager platform 90 via an API. For example, all or a portion of the display data, which may include the display data and/or odds data, may be provided to the H2H jai alai wager platform 90 via an API or other data delivery or service route to provide one or more of odds data, scoring related data, wager servicing, or video data for interaction with users.

When the H2H jai alai wager servicing subsystem 15 provides odds data to a participating sportsbook or H2H jai alai wager platform 90, which may be associated with a participating sportsbook, or a H2H jai alai wager platform 90 includes or communicates with an odds generator 90 to receive odds data, the odds generator 40 may generate odds for participating sportsbooks or H2H jai alai wager platform 90 that incorporate one or more factors specific to the sportsbook or H2H jai alai wager platform 90. For example, factors specific to a participating sportsbook or H2H jai alai wager platform 90 may include volume risk, balance of action, or the like. In some configurations, the wager module 60 may track action related to participating sportsbooks or H2H jai alai wager platform 90—e.g., wager volume and/or balance of action per wager option, in one or more wager groupings, or in bulk—and provide the action data to the odds generator 40. The odds generator 40 may include predefined rules relating to factors to be applied for participating sportsbooks or H2H jai alai wager platform 90 and may apply the specific rules to the action related to the participating sportsbooks or platforms when generating the odds. The odds generator 40 may then label the odds specific to participating sportsbooks or H2H jai alai wager platform 90 when transmitting the odds data to the interface module 50, which may be associated with the H2H jai alai wager servicing subsystem 15 or H2H jai alai wager platform 90. Where necessary, the interface module 50 may integrate the odds data with the wager options and/or distribute the odds data accordingly. In some embodiments, the odds generator may transmit the odds data H2H jai alai wager platform 90 for integration by an interface module 50 of the H2H jai alai wager platform 90. In some embodiments, the H2H jai alai wager servicing subsystem 15 utilizes an outside odds generator 40 and may provide the odds data to the interface module 50 and/or H2H jai alai wager platform 90.

As introduced above, in some embodiments, the wager module 60 may identify wager winners or completed wagers using scoring related data. The identified winners may be transmitted to the transaction module 80 for servicing the payout, if any, which may be to a user or a participating sportsbook or H2H jai alai wager platform 90 through which the wager was made. The transaction module may transfer or credit funds into appropriate accounts, which may include an account held by or with the H2H jai alai wagering system 10, H2H jai alai wager servicing subsystem 15, participating sportsbooks, H2H jai alai wager platforms 90, or a third party, such as a digital wallet, e.g., banking app account, GOOGLE WALLET™, GOOGLE PAY®, APPLE PAY®, ALIPAY®, VENMO®, ZELLE®, DWOLLA®, or PAYPAL®. Such digital transfer platforms may also act as a transaction facilitator 80 to transfer funds to user accounts.

In one embodiment, the wager module 60 may receive user account information from the user that identifies the user account along with authorization of the fund transfer from the user account. The wager module 60 may direct the transaction module 80 to transfer the wager funds to an account of a participating sportsbook or H2H jai alai wager platform 90 or may credit or transfer the wagered funds into a holding account on behalf of the participating sportsbook or H2H jai alai wager platform 90 for settlement at a later time. In some embodiments, the H2H jai alai wagering system 10 operates as a sportsbook in addition to or instead of operating in a facilitator or servicer role. In some embodiments, the transaction module 80 may execute credits and debits of party accounts to pay in wager funds, receive wagered funds, and payout winnings. Fund transfers may be by cash, credit card, and/or digital transfers, which may include crediting and/or debiting an account the user has with the system. The transfers may utilize transfer facilitators 100, which may include digital transfer platforms and/or digital wallets, e.g., as described elsewhere herein.

In some embodiments, the wager module 60 may provide account information to the user interface 70 to which wagered funds are to be transferred. Users may then direct transfer of the wagered funds into the account, which may be an account held by a participating sportsbook or H2H jai alai wager platform 90 through which the bet is taken, a holding account for the same, or a system account if the H2H jai alai wagering system 10 is taking the bet. The transfer may include a digital transfer, which may utilize a transaction facilitator 80 or otherwise. The accounts involved in the transfer may be held by the transaction facilitator 80, third-party banks or financial institutions, which may include digital wallet or similar accounts.

In various embodiments, winning payouts may be facilitated or directed by the wager module 60 and transaction module 80 in manners similar to those in which wagered funds may be directed. For example, upon determination that a user has successfully won a wager, e.g., via indication of the user has won a bet and/or linking the user to a bet placed that corresponds to a winning event, the wager module 60 may direct the payment to the user via the transaction module 80, e.g., credit or transfer winnings to the user account or direct a direct payment.

As noted above, the H2H jai alai wager servicing subsystem 15 may include one or more of a scoring module 30, odds generator 40, interface module 50, transaction module 80, video host 55, or transaction facilitator 85. The H2H jai alai wager servicing subsystem 15 may be configured to provide one or more types of products or services, e.g., system data or functionalities, to the H2H jai alai wager platform 90. All or predetermined portions of the system data streams and functionalities associated with the modules and generator may be provided to the H2H jai alai wager platform 90 by the H2H jai alai wager servicing subsystem 15. For example, the H2H jai alai wager platform 90 may select data and functionality services a la carte. For instance, the H2H jai alai wager platform 90 may, for example, receive scoring related data collected by the scoring module 30 and odds data generated by the odds generator 40 (see, e.g., FIGS. 6 & 7). The H2H jai alai wager platform 90 may utilize the odds data to generate an interactive display incorporating the odds data with a plurality of wager options that may be wagered on by users of the H2H jai alai wager platform 90. The H2H jai alai wager platform 90 may thus include an interface module 50 configured to perform the operations described herein. The H2H jai alai wager platform 90 may include a wager module 60 for accepting wager requests. The H2H jai alai wager platform 90 may include a transaction module 80 configured to perform the operations described herein. However, the H2H jai alai wagering system 10 may comprise a flexible wagering service wherein one or more H2H jai alai wager platform 90 may receive any combination of system products and/or services from the H2H jai alai wager servicing subsystem 15 and be further configured to include remaining data generation and functionalities to provide H2H jai alai wagering as described herein. For example, the H2H jai alai wager servicing subsystem 15 may include a scoring module 30, odds generator 40, interface module 50, and transaction module 80. Any combination of the system data streams and functionalities may be provided to the H2H jai alai wager platform 90. The H2H jai alai wager platform 90 may include a wager module 60 to accept wager requests and an interface module 50 to generate an interactive display and interface with users as described herein. In some embodiments, even when configured to provide an H2H jai alai wager platform 90 only a portion of the data stream and functionalities, the H2H jai alai wager servicing subsystem 15 may include modules and generators to generate data streams including different combinations of associated system data streams and functionalities to other H2H jai alai wager platform 90 having different predetermined servicing requirements.

It will be appreciated that in one embodiment, the H2H jai alai wagering system 10 includes multiple interface modules 50 specific to one or more participating sportsbooks or H2H jai alai wager platform 90. The odds generator 40 may then transmit the odds to the associated participating sportsbooks or platforms. In one example, the H2H jai alai wagering system 10 includes multiple odds generators 40 and associated interface modules 50. Each odds generator 40 may be tasked with generating odds 40 for one or more specific sportsbooks or H2H jai alai wager platform 90 according to the rules, and may then transmit the odds to the associated participating sportsbooks or H2H jai alai wager platform 90. In one configuration, the wager module 60 may be configured to generate an action report.

As noted above, the odds generator 40 described with respect to FIGS. 3-8, may generate odds specific for a particular participating sportsbook that are different than those generated for another participating sportsbook. The specific odds may incorporate factors specific to the participating sportsbook such as volume risk, balance of action, or the like. In some embodiments, the wager module 60 provides an indication of an outcome of a bet specific to a user or as applicable to a particular bet to the user interface 70. This indication may comprise a notification transmitted directly to the user device 75 by the wager module 60, which may be incorporated into the display or separately presented. In another configuration, the indication may be provided to the interface module 50 by the wager module 60, and the interface module 50 may provide a notification to the user device 75 associated with the wager. The notification may be incorporated into the display or separately presented. The wager module 60 and/or interface module 50 may link the wager to the user device 75 making the wager and/or a user account making the wager.

As introduced above, the H2H jai alai wager platform 90 may include one or more modules or generators, e.g., a scoring module 30, odds generator 40, interface module 50, or transaction module 80, to perform associated wager operations not provided by the H2H jai alai wager servicing subsystem 15. In some embodiments, the H2H jai alai wager platform 90 may act as an intermediary with respect to users of the H2H jai alai wager platform 90 and the H2H jai alai wager servicing subsystem 15. For example, the H2H jai alai wager platform 90 may transmit wager requests and/or wager related transactions to the H2H jai alai wager servicing subsystem 15 or system modules or generators for servicing by the responsible components of the respective functionalities.

FIGS. 10A-12C illustrate various interactive displays 100 that may be generated and presented to users on a display 76 (see, e.g., FIGS. 3-9) according to various embodiments described herein.

Figure 10A:
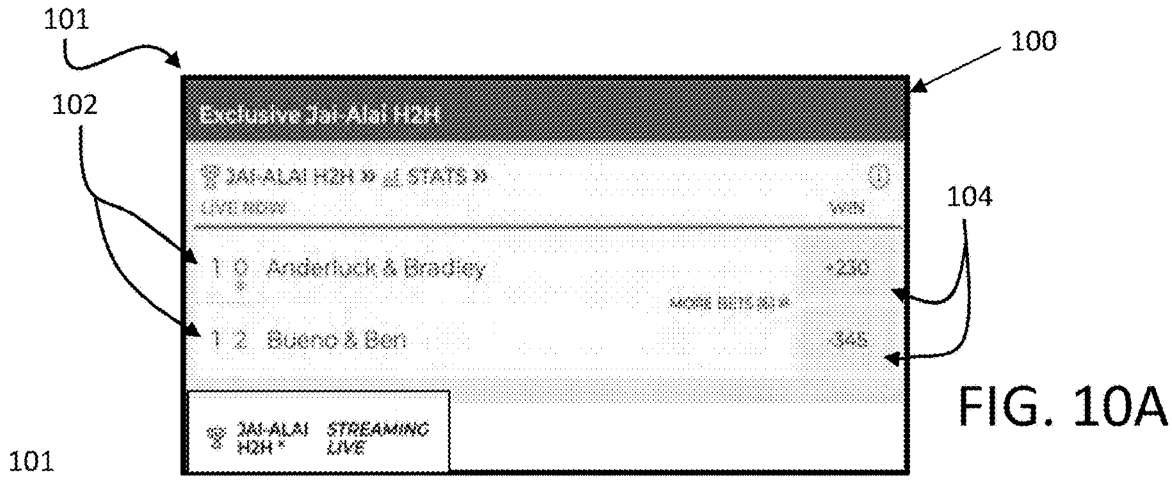
FIGS. 10A-10C depict interactive displays of the H2H jai alai wager system including an odds display according to various embodiments described herein.
Figure 10B:
Figure 10C:
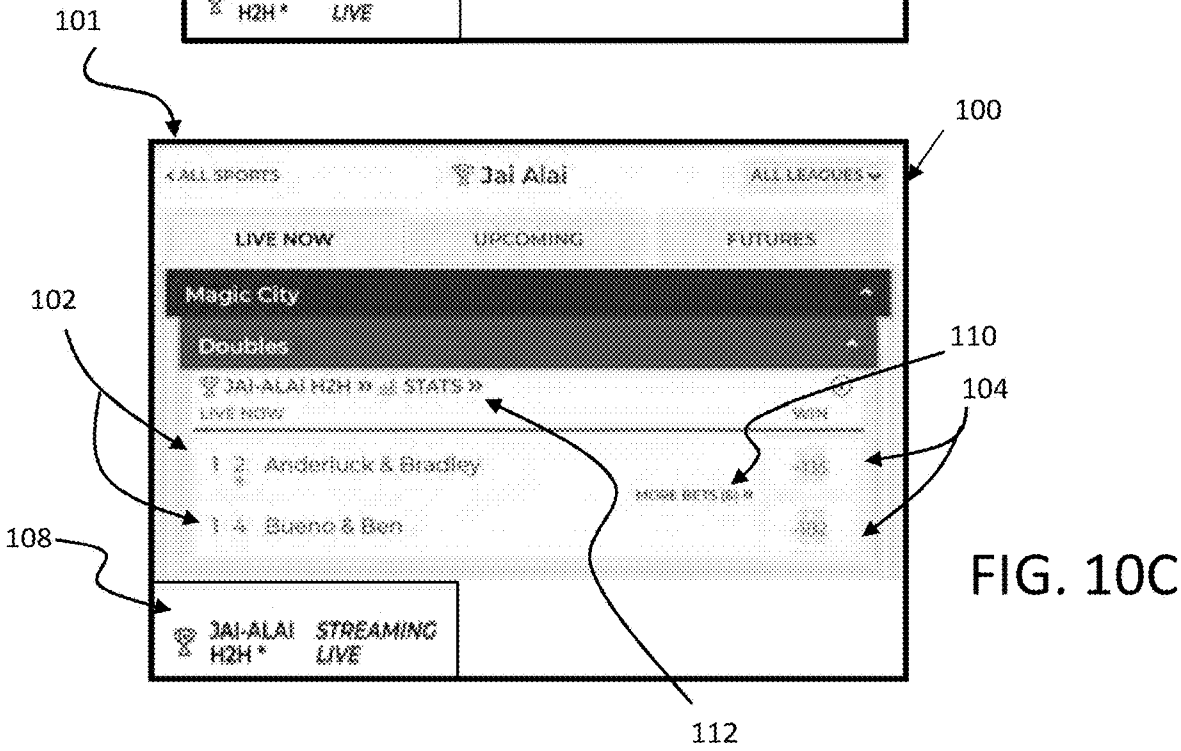

FIG. 10A illustrates an interactive display 100 comprising an odds display 101 for a H2H jai alai match. The odds display 101 includes identification of the competing players/teams 102 and the odds 104 with respect to each player/team 102. As introduced above, odds 104 may be updated in real time, during play of the H2H jai alai match. For example, FIGS. 10B & 10C illustrate the interactive display 100 following odds updates during play of the match shown in FIG. 10A, in which the teams are tied at one set a piece and team Bueno & Ben is up two points to zero over their opponent, team Anderluck & Bradley. In the odds display shown in FIG. 10A, team Bueno & Ben is given odds to win the set at −345 while team Anderluck & Bradley is given +230 odds of winning. In FIG. 10B, team Bueno & Ben is up three points to one point and their odds to win are −420 while team Anderluck & Bradley is given +270 odds for winning. In FIG. 10C, team Bueno & Ben is up four points to two points and their odds to win are −182 while team Anderluck & Bradley is given +135 odds of winning. In some embodiments, similar real time odds 104 may be presented with respect to wagers and odds for winning a match as well as other wager types applicable to the live H2H jai alai action. For example, the odds display 101 may include additional available wagers on a the same or different odds displays 101. In the illustrated embodiment, a portal 110 comprising a link to additional betting options is provided. A user may select the portal 110 and view additional available wagers, which may include real time odds while the match is being played.

In some embodiments, the interactive display 100 may include a stats feature where users may be presented with data related to the available wagers. For example, a user may interact with the interactive display 100 by selecting a stats portal 112, which may be presented as a selectable link or button, to view stats related to one or more available wagers. The stats may include information about the participants such as individual and/or team stats in previous matches, how they have performed against odds or against their opponents or similar opponents subject of the wager. Stats may include performance related stats such as serve efficiency or success and/or return efficiency or success. Additionally or alternatively, the stats may include overall won/loss record and other details of prior matchups between the players/teams 102 competing in the match subject to one or more available wagers.

In various embodiments, the interactive display 100 may include or integrate live video data of the H2H jai alai match. The live video data may be presented on the same or different display view as the real time odds 104 and/or wager requests. For example, the interactive display shown in FIG. 10C includes a selectable live video stream button 108 to allow users to view live video of the H2H jai alai match. As noted above and with particular reference to FIG. 11, in some embodiments, the live video data may be integrated into the interactive display 100 to allow the user to view live video 122 of the H2H jai alai match while at the same time viewing the real time odds 104, thereby providing a platform for real time wagering that immerses the user with the live action that is woven by the interaction between the live H2H jai alai, real time odds, and wagering. In some embodiments, the interactive display 100 may allow a user to incorporate the live video 122 within the same display as the odds data 104 and/or move or relocate the live video 122 to a separate page, tab, or widow, such as those of a browser.

In various embodiments, the interactive display 100 includes an account link 114 configured to link a user to their account, wherein the user may view various account features, settings, or options. In one example, via the account link 114, a user may select from among a plurality of features of the interactive display 100 or H2H wager system to be displayed on the interactive display 100. For example, a user may define odds display 101 and/or live video 122 display layouts. In a further or another example, a user may define features to be included in a quick reference window 116 of the interactive display 100. The interactive display 100 may also include an account total 118 with respect to the user's account that displays the funds currently in the user's account, which in some embodiments, may be provided in a quick reference window 116. In some embodiments, the interactive display 100 may include a transaction portal 120 or link, which is identified as "cashier" in the illustrated embodiment, to add or withdraw funds with respect to their account. Entering the transaction portal 120 may access the transaction module, which may further include communications and/or functionalities with respect to transaction facilitators, as described elsewhere herein.

Figure 11:
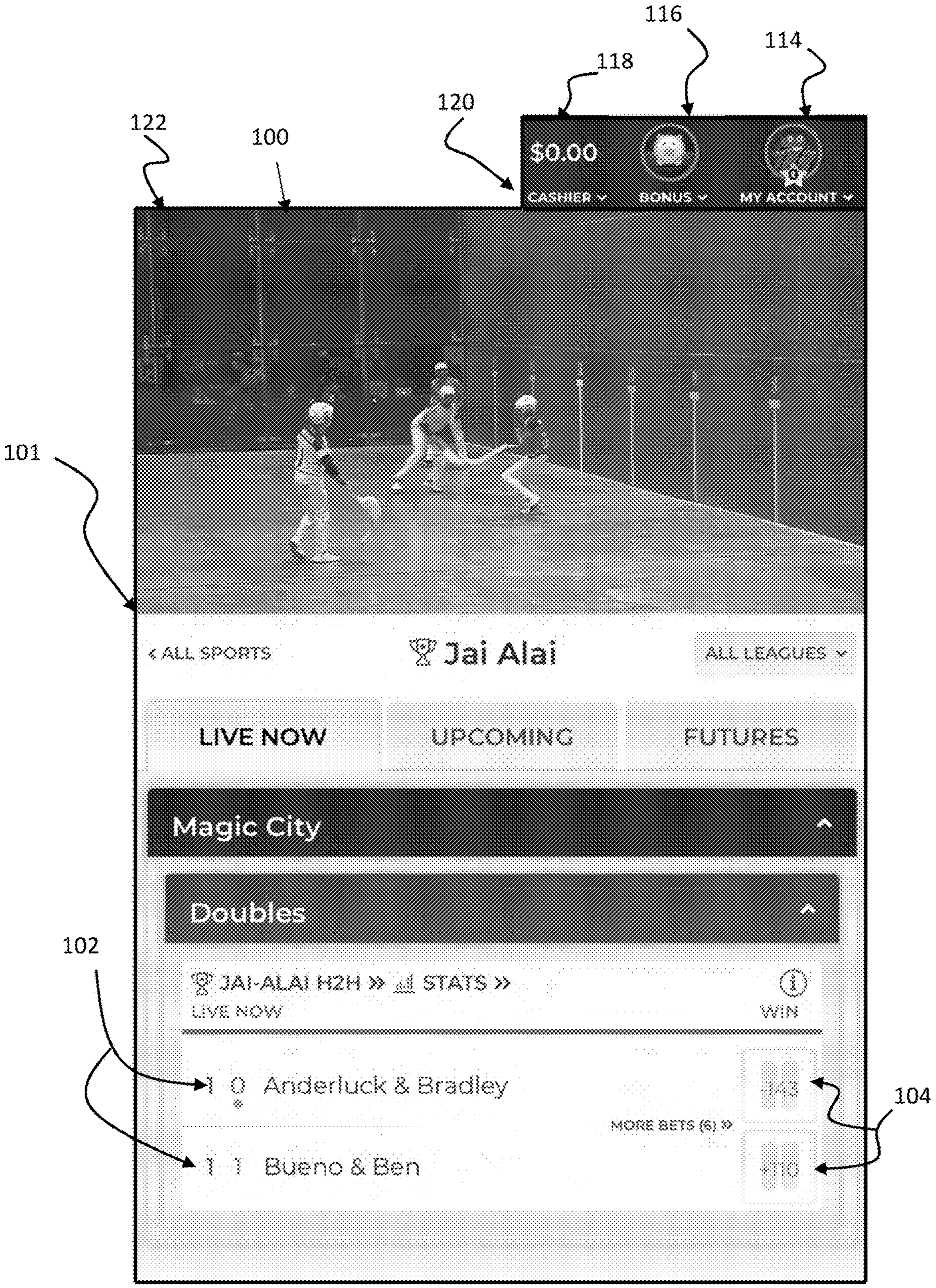
FIG. 11 depicts an interactive display of the H2H jai alai wager system including live video data according to various embodiments described herein.

While the interactive display 100 depicted in FIG. 11 is shown including an account link 114 along with a quick reference window 116, other displays of the interactive display 100 may include one or more of an account link 114, a quick reference window 116, account total 118, or transaction portal 120.

Figure 12A:
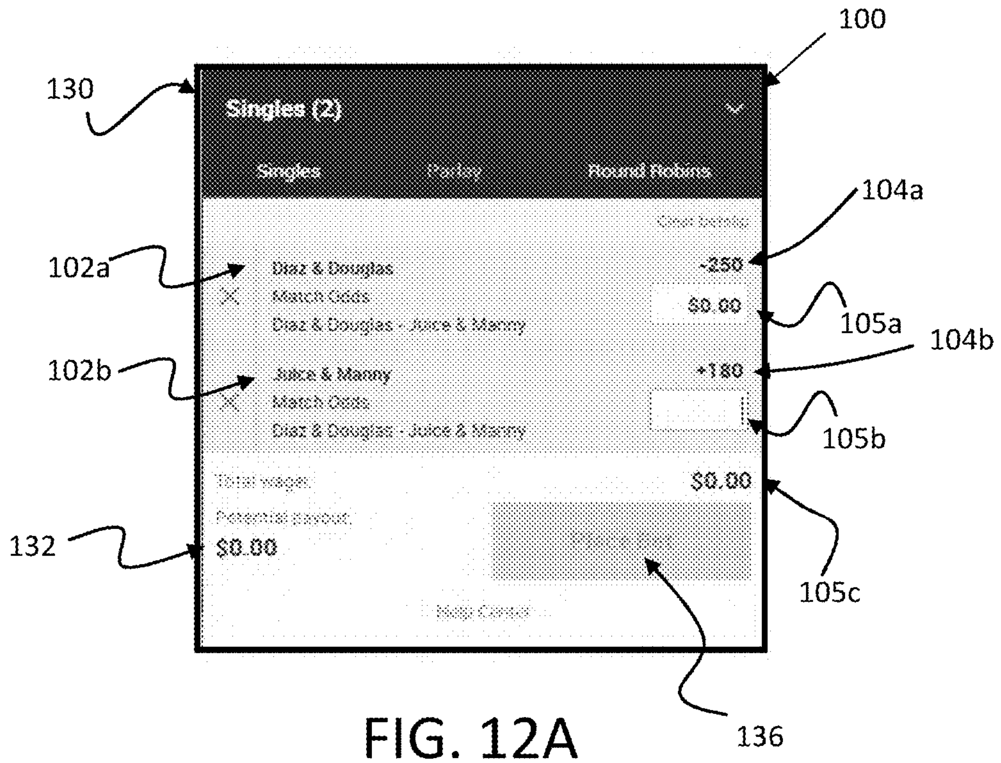
FIGS. 12A-12C depict interactive displays of the H2H jai alai wager system including a wager request display according to various embodiments described herein.
Figure 12B:
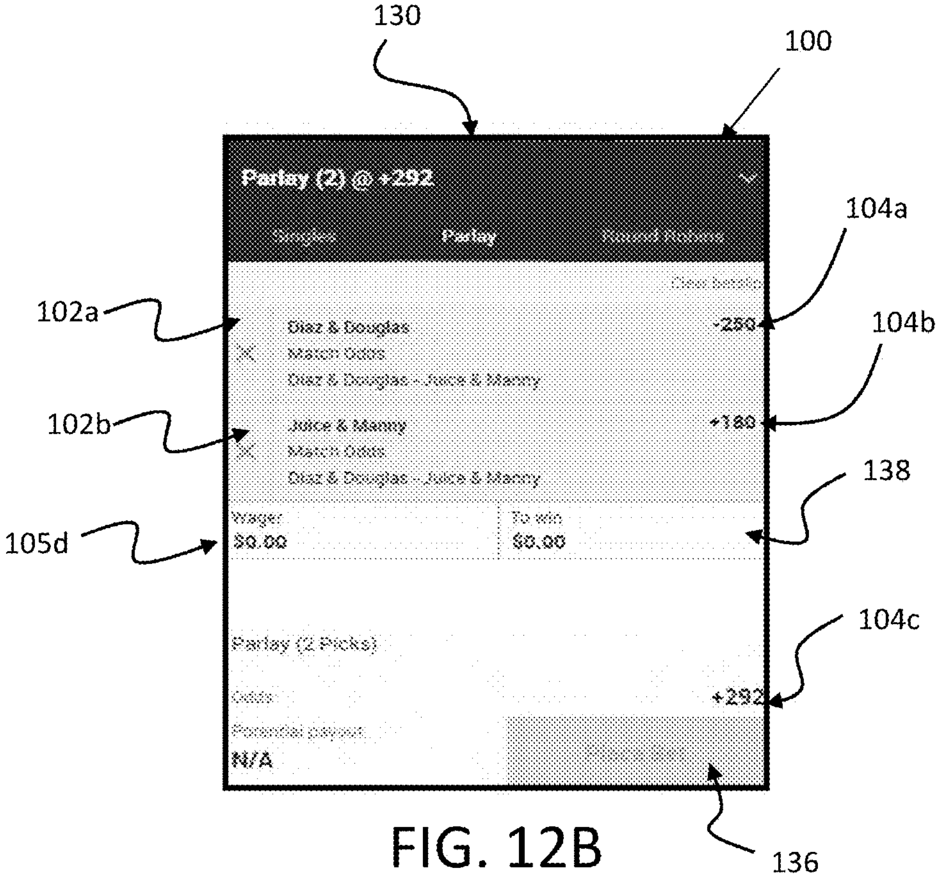
Figure 12C:
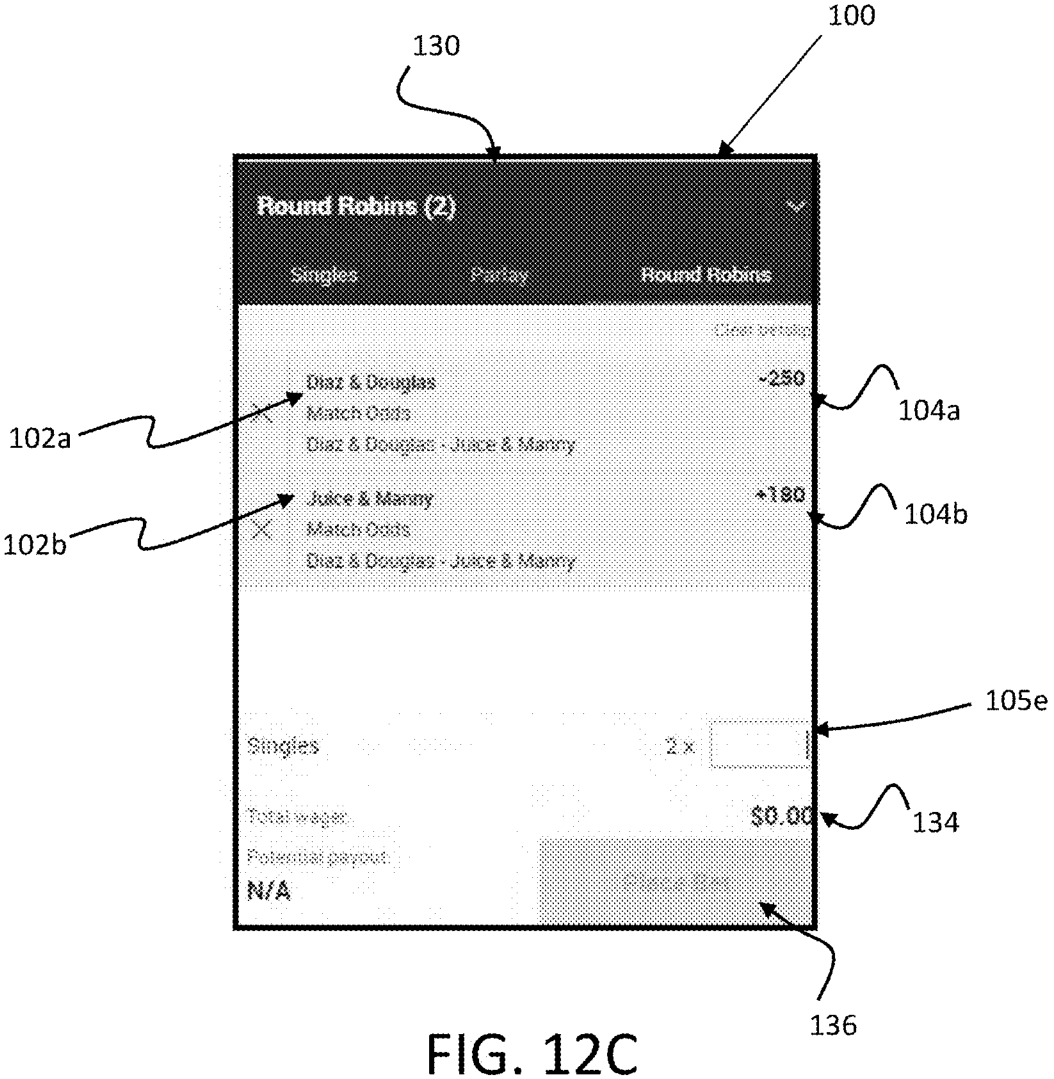

In the example interactive displays 100 shown in FIGS. 10A-11, selecting a player/team 102 or odds 104 associated with a player/team 102 may cause presentation of an interactive display 100 including a wager request display 130 (see, e.g, FIGS. 12A-12C). The wager request display 130 may include a field for the user to enter an amount to be wagered with respect to the player/team 102 selected at the real time odds 104. The real time odds 104 may be subject to change in real time as the match progresses as the odds of the selected outcome change. Thus, a user may be required to enter a wager amount and confirm the amount for submission to the wager module before the subject odds 104 change. As noted above, the odds 104 may be valid for a set period of time or until the occurrence of a particular event, such as a next serve, next point, or next set. In some examples, a time period or subject event in which the odds 104 are subject to change may be presented on the interactive display 100. In one example, a time or countdown may be displayed on an odds display 101 or wager request display 130 to indicate when the odds are subject to change.

In some embodiments, an odds display 101 or wager request display 130 may include a plurality of predefined wager amounts that may be quickly selected by the user. Upon selection of a predefined wager amount, the user may be required to quickly indication or select submission of the request for transmission of the wager to the wager module. In one embodiment, predefined wager amounts may be subject to one-click wager submissions. For example, once a user selects a predefined amount, the amount may be automatically transmitted to the wager module as a wager request. In some configurations, a user may define, for example within their user account, whether they would like to enable or disable one-click wager submissions. In a further or another example, a user may select or define amounts to be included in predefined amounts for wagers, whether with respect to wager amount or one-click wager submissions.

Wager requests may be given a time stamp that the wager module may use to determine odds subject to the wager. For example, in one embodiment, the wager request is given a time stamp corresponding to a time when the user provided indicated submission of the wager request. In another embodiment, the wager request is given a time stamp upon receipt of the request by the wager module.

In some embodiments, the wager module incorporates a buffer period wherein the wager module will accept wager requests based on otherwise expired odds 104 relative to the time stamp of the request. Such a buffer period may address time lag in a real time betting environment between user interaction with the interactive display 100 with respect to submitting a wager request and/or network or other lag for presenting updated odds. For example, a buffer period of about a 0.5 seconds, about a 1 second, about a 1.5 second, about a 2 second, about a 2.5 second, about a 3 second, about a 3.5 second, about a 4 second, or about a 4.5 second may be used. In one example, the buffer period is between 0.25 seconds and 5 seconds, such as between 0.25 seconds and 4.5 seconds, between 0.25 seconds and 4 seconds, about 0.25 seconds and 3.5, about 0.25 seconds and about 3 seconds, between 0.25 seconds and 2.5 seconds, between 0.25 seconds and 2 seconds, between 0.25 seconds and about 1.5 seconds, between 0.25 seconds and 1 second, between 1 second and 4 seconds, between 1 second and 3 seconds, or between about 1 second and 2 seconds.

In any of the above embodiments or examples, the real time odds 104 may also be presented on the wager request display 130 of the interactive display 100 where they may be subject to change in real time as the match progresses and the odds of the selected outcome change.

In one embodiment, if the odds 104 change prior to submission, the interactive display 100 may notify the user that the odds 104 have changed and prompt the user to either confirm the wager subject to the updated odds 104 or resubmit the request with a modified wager amount if the user wishes to continue with the wager based on the updated odds 104.

FIGS. 12A-12C illustrate example wager request displays 130. In FIG. 12A, the user has selected two single wagers: team Diaz & Douglas 102*a* to win at −250 odds 104*a* and Juice & Manny 102*b* at −180 odds 104*b*. Each of the wagers includes a wager amount field 105*a*, 105*b* the user may use to define the amount to be wagered on each wager. The wager request display 130 may also include a total wager calculation 105*c* and a projected payout calculation 132 that informs the user of the projected payout. A request transmittal button 136 may be provided for the user to select to transmit the wager request to the transaction module.

FIG. 12B illustrates an example wager request display 130 for a parlay wager. The user has selected two bets to parlay: team Diaz & Douglas 102*a* to win at −250 odds 104*a* and Juice & Manny 102*b* at −180 odds 104*b*. Notably, in typical operation, such a parlay between the same two teams would correspond to different points, sets, and or matches. Additionally, other wagers with respect to different or same H2H jai alai matches, such as those identified herein, may be parlayed. The wager request display 130 for the parlay includes a wager amount field 105*d* that user may use to define the amount to be wagered. The wager request display 130 may also include a to win calculation 138 to informs the user of the amount won if the parlay is successful. The wager request display 130 may also include a combined odds calculation 104*c* for the parlay. A request transmittal button 136 may be provided for the user to select to transmit the wager request to the transaction module.

FIG. 12C illustrates an example wager request display 130 for a round robin wager. The user has selected two outcomes: team Diaz & Douglas 102*a* to win at −250 odds 104*a* and Juice & Manny 102*b* at −180 odds 104*b*, resulting in two bets. As with the singles and parlay, additional and/or different types and wager events may also be used. The wager request display 130 for the round robin includes a wager amount field 105*e* that user may use to define the amount to be wagered, which is multiplied by two, corresponding to the number of bets in the round robin. The wager request display 130 may also include a total wager calculation 134 to informs the user of the amount wagered. A request transmittal button 136 may be provided for the user to select to transmit the wager request to the transaction module.

Further to the above, the H2H jai alai wagering systems and methods may include dedicated hardware implementations including, but not limited to, application-specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example network or system is applicable to software, firmware, and hardware implementations. As used herein "transmit" means that data or representation of the data is transmitted by wire, wirelessly, or is otherwise made available to the receiving component, e.g., process, algorithm, module, operator, engine, generator, controller, or the like. In some examples, data transmitted to a receiving component may be transmitted to another component or database wherein the data may be further transmitted to the receiving component or otherwise made available to the receiving component. Thus, data transmitted by a first component/processing module to a second component/processing module may be directly or indirectly transmitted. In one example, data may be transmitted by the transmitting component or another component to a receiving component by transmitting an address, location, or pointer to the data stored in memory, such as one or more databases.

In accordance with various embodiments of the present disclosure, the processes with respect to the H2H jai alai wagering systems and methods described herein may be intended for operation as software programs running on a computer processor. Furthermore, software implementations can include but are not limited to, distributed processing or component/object distributed processing, parallel processing, or virtual machine processing that may be constructed to implement the methods described herein.

The present disclosure describes various systems, modules, units, devices, components, and the like. Such systems, modules, units, devices, components, and/or functionalities thereof may include one or more electronic processors, e.g., microprocessors, operable to execute instructions corresponding to the functionalities described herein. Such instructions may be stored on a computer-readable medium. Such systems, modules, units, devices, components, the like may include functionally related hardware, instructions, firmware, or software. For example, modules or units thereof, which may include generators or engines, may include a physical or logical grouping of functionally related applications, services, resources, assets, systems, programs, databases, or the like. The systems, modules, units, which may include data storage devices such as databases and/or pattern library may include hardware storing instructions configured to execute disclosed functionalities, which may be physically located in one or more physical locations. For example, systems, modules, units, or components or functionalities thereof may be distributed across one or more networks, systems, devices, or combination thereof. It will be appreciated that the various functionalities of these features may be modular, distributed, and/or integrated over one or more physical devices. It will be appreciated that such logical partitions may not correspond to the physical partitions of the data. For example, all or portions of various systems, modules, units, or devices may reside or be distributed among one or more hardware locations.

The present disclosure contemplates a machine-readable medium containing instructions so that a device connected to a communications network, another network, or a combination thereof, can send or receive voice, video, text data, or other data, which may include payment information and/or fund transfers, and to communicate over the communications network, another network, or a combination thereof, using the instructions. The instructions may further be transmitted or received over the communications network, another network, or a combination thereof, via the network interface device. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure. The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or re-organizing any of the disclosed steps, components, elements, features, aspects, characteristics, limitations, and the like, of the various non-limiting and non-exhaustive embodiments described in this specification. Various elements described herein have been described as alternatives or alternative combinations. It is to be appreciated that embodiments may include one, more, or all of any such elements. Thus, this description includes embodiments of all such elements independently and embodiments, including such elements in all combinations.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" corresponds to "x and/or y" and refers to "x", "y", or both "x" and "y", whereas "either x or y" refers to exclusivity.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments could be modified, reduced, or enhanced without departing from the scope and spirit of the claims described below.

What is claimed is:

1. A wagering system, the system comprising:

an interface module to receive odds data generated by an odds generator, the odds data comprising real time odds with respect to a plurality of wager options corresponding to a competition, wherein the interface module generates display data that includes the plurality of wager options and corresponding real time odds for presentation on a graphical display of a user device configured to receive user inputs comprising wager requests including wager amounts based on the displayed real time odds with respect to wager options of the plurality or wager options, wherein each wager request is given a time stamp corresponding to a time the wager request was submitted by the user, wherein the time stamp is used to determine the real time odds applicable to the wager request, wherein, if a comparison of the real time odds applicable to the time stamp and the displayed real time odds the wager request was based indicates the real time odds were updated prior to submission of the wager request, a notification is generated for presentation on the user device that prompts the user to confirm the wager request subject to the updated real time odds or resubmit the wager request with a modified wager amount if the user wishes to continue with the wager based on the updated real time odds.

2. The system of claim 1, wherein the wager requests include associated account information of the user of the user device from which wagered funds are to be withdrawn and winnings are to be deposited.

3. The system of claim 2, further comprising a transaction module to process transactions with respect to the wager requests.

4. The system of claim 3, wherein the transaction module is configured to use the associated account information to identify and debit accounts associated with the users in the respective amounts wagered.

5. The system of claim 3, comprising a wager module to receive the wager requests and scoring related data with respect to the competition.

6. The system of claim 5, wherein the wager module is configured to analyze the scoring related data to determine if a wager of the wager requests is complete, and wherein if the wager module determines the wager is complete, the wager module is configured to determine if the wager is a winning wager, and wherein, if the wager is a winning wager, the transaction module is configured to credit the account associated with the user requesting the wager.

7. The system of claim 1, further comprising:

a scoring module to collect scoring related data from the competition;

the odds generator to receive the scoring related data from the scoring module and generate the odds data based at least in part on the scoring related data; and a transaction module to process transactions with respect to the wager requests from the users, wherein the system is configured to provide the data and functionalities of the respective scoring module, odds generator, interface module, and transaction module as à la carte digital wagering services from which wagering platforms may select all or portions of the digital wagering services to achieve a desired level of autonomy, and wherein the odds generator incudes pre-defined rules relating to factors to be applied for participating wager platforms and is configured to apply the rules to the odds data generated specific for the participating wager platforms.

8. A wagering method, the method comprising:

receiving odds data generated by an odds generator, the odds data comprising real time odds for a plurality of wager options with respect to a competition;

generating display data that includes the plurality of wager options and corresponding real time odds for presentation on a graphical display of a user device configured to receive user inputs comprising wager requests including wager amounts based on the displayed real time odds with respect to wager options of the plurality or wager options;

associating a time stamp with each wager request corresponding to a time the wager request was submitted by the user;

comparing the displayed real time odds the wager request was based with real time odds applicable to the time stamp to determine if the real time odds were updated prior to submission of the wager request; and generating a notification for presentation on the user device if the real time odds were updated prior to submission of the wager request, wherein the notification prompts the user to confirm the wager request subject to the updated real time odds or resubmit the wager request with a modified wager amount if the user wishes to continue with the wager based on the updated real time odds.

9. The method of claim 8, further comprising determining whether to accept a wager specified in one of the wager requests and, if accepted, determining if the accepted wager is complete, wherein, if the accepted wager is complete, determining if the user associated with the accepted wager has won the accepted wager, wherein, if the user has won the accepted wager, crediting an account associated with the user.

10. The method of claim 8, further comprising integrating video of the competition into the graphical display.

11. The method of claim 8, further comprising receiving the wager requests from the user devices, the wager requests initiated by the users of the user devices via user interaction with the graphical display that defines a desired wager to be made with respect to the plurality of wager options.

12. The method of claim 8, wherein the wager requests are associated with user accounts from which wagered funds are to be withdrawn and winnings are to be deposited.

13. The method of claim 12, further comprising determining whether to accept wagers specified in wager requests and, if accepted, debiting the respective user accounts associated with the wager requests in amounts corresponding to the amounts wagered.

14. The method of claim 8, further comprising:

collecting real time scoring related data from the competition;

transmitting the real time scoring related data to the odds generator;

processing the wager requests; and providing the real time scoring related data, the real time odds, and the processing of wager requests as à la carte digital wagering services from which wagering platforms may select all or portions of the digital wagering services to achieve a desired level of autonomy.

15. A non-transitory computer-readable medium having computer-executable instructions that, when executed by a processor, cause the processor to perform operations of a wagering method comprising:

receiving odds data generated by an odds generator, the odds data comprising real time odds for a plurality of wager options with respect to a competition;

generating display data that includes the plurality of wager options and corresponding real time odds for presentation on a graphical display of a user device configured to receive user inputs comprising wager requests including wager amounts based on the displayed real time odds with respect to wager options of the plurality or wager options;

associating a time stamp with each wager request corresponding to a time the wager request was submitted by the user;

comparing the displayed real time odds the wager request was based with real time odds applicable to the time stamp to determine if the real time odds were updated prior to submission of the wager request; and generating a notification for presentation on the user device if the real time odds were updated prior to submission of the wager request, wherein the notification prompts the user to confirm the wager request subject to the updated real time odds or resubmit the wager request with a modified wager amount if the user wishes to continue with the wager based on the updated real time odds.

16. The non-transitory computer readable medium of claim 15, wherein the operations further comprise determining whether to accept a wager specified in one of the wager requests and, if accepted, determining if the accepted wager is complete, wherein, if the accepted wager is complete, determining if the user associated with the accepted wager has won the accepted wager, wherein, if the user has won the accepted wager, crediting an account associated with the user.

17. The non-transitory computer readable medium of claim 15, wherein the operations further comprise integrating video of the competition into the graphical display.

18. The non-transitory computer readable medium of claim 15, wherein the operations further comprise receiving the wager requests from the user devices, the wager requests initiated by the users of the user devices via user interaction with the graphical display that defines a desired wager to be made with respect to the plurality of wager options.

19. The non-transitory computer readable medium of claim 15, wherein the wager requests are associated with user accounts from which wagered funds are to be withdrawn and winnings are to be deposited.

20. The non-transitory computer readable medium of claim 19, wherein the operations further comprise determining whether to accept wagers specified in wager requests and, if accepted, debiting the respective user accounts associated with the wager requests in amounts corresponding to the amounts wagered.

21. The non-transitory computer readable medium of claim 15, wherein the operations further comprise:

collecting real time scoring related data from the competition;

transmitting the real time scoring related data to the odds generator;

processing the wager requests; and providing the real time scoring related data, the real time odds, and the processing of wager requests as à la carte digital wagering services from which wagering platforms may select all or portions of the digital wagering services to achieve a desired level of autonomy.

* * * * *